(12) United States Patent
Tanoue et al.

(10) Patent No.: US 6,527,969 B1
(45) Date of Patent: Mar. 4, 2003

(54) METHOD AND APPARATUS FOR REJUVENATING POLISHING SLURRY

(75) Inventors: Akihiro Tanoue, Toyama (JP); Yutaka Matsuzawa, Toyama (JP); Koji Shimizu, Niigata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/552,622

(22) Filed: Apr. 19, 2000

(30) Foreign Application Priority Data

Apr. 23, 1999 (JP) .......................................... 11-115958

(51) Int. Cl.⁷ .............................................. B24B 1/00
(52) U.S. Cl. ...................................................... 216/93
(58) Field of Search ........................ 156/345.18; 451/60, 451/447; 216/93, 88, 89, 90, 91

(56) References Cited

U.S. PATENT DOCUMENTS

| | | | |
|---|---|---|---|
| 5,755,614 A | * | 5/1998 | Adams et al. ................. 451/60 |
| 6,096,185 A | * | 8/2000 | Corlett et al. ................ 205/742 |
| 6,126,531 A | * | 10/2000 | Iida et al. ................... 451/447 |
| 6,291,350 B1 | * | 9/2001 | Hashimoto et al. ......... 438/692 |

FOREIGN PATENT DOCUMENTS

| | | |
|---|---|---|
| JP | 08-115892 | 5/1996 |
| JP | 10-118899 | 5/1998 |
| JP | 11-10540 | 1/1999 |
| JP | 11-33362 | 2/1999 |
| JP | 11-87284 | 3/1999 |

OTHER PUBLICATIONS

English translation of JP 08–115892.*
English translation of JP 10–118899.*
Japanese Office Action, Mailed Jul. 30, 2002.

* cited by examiner

Primary Examiner—Marian C. Knode
Assistant Examiner—Sylvia R. MacArther
(74) Attorney, Agent, or Firm—Nixon Peabody LLP; Thomas W. Coie

(57) ABSTRACT

A method for rejuvenating a polishing slurry that has been used for a chemical-mechanical polishing process includes the steps of: recovering the polishing slurry; and re-dispersing abrasive grains contained in the polishing slurry recovered. Specifically, the abrasive grains may be re-dispersed by adding a dispersant or applying an electromagnetic field or ultrasonic radiation to the polishing slurry recovered.

17 Claims, 16 Drawing Sheets

US 6,527,969 B1

METHOD AND APPARATUS FOR REJUVENATING POLISHING SLURRY

BACKGROUND OF THE INVENTION

The present invention relates to a method and apparatus for rejuvenating polishing slurry to be recovered and recycled in a chemical-mechanical polishing (CMP) process of a substrate, typically a semiconductor wafer.

Recently, in a process of fabricating transistors on a semiconductor wafer, a CMP process is often carried out to increase the uniformity of the wafer surface by planarizing an interlevel dielectric film thereon, for example. In the CMP process, polishing slurry, in which fumed or colloidal silica particles are dispersed as abrasive grains in an alkaline aqueous solution, for instance, is used.

The size of primary colloidal silica particles is between 20 and 30 nm. When these primary particles agglomerate together, secondary colloidal silica particles with a size of about 200 nm are formed. On the other hand, the size of fumed silica particles, which are obtained at the beginning of preparation by finely pulverizing their flakes greater in sizes, is about 200 nm.

The polishing slurry contains various contaminants such as abrasive grains with their properties degraded during polishing, pad debris that has been removed from a pad through conditioning and abraded parts of the workpiece (e.g., wafer). During polishing or waste recovery, a great number of those secondary particles might agglomerate together due to a significant change in hydrogen ion exponent (pH) or externally applied kinetic energy. As a result, excessively large particles with a size of 700 to 1500 nm might also exist in the slurry. If such chemically deteriorated, consumed slurry is used again as it is, then the uniformity of the wafer surface may be adversely affected or micro-scratches may be formed thereon. Thus, once used for polishing, the slurry recovered is usually recovered and discarded.

However, since the CMP process using slurry is carried out at an increasing number of facilities these days, increase in costs required for safe waste disposal and environmental protection is coming closer to an alarming level. To cope with such a problem, various techniques have been suggested to recycle the once-used slurry by recovering and rejuvenating it.

FIG. 21 schematically illustrates an arrangement of a prior art polishing slurry recovery system as disclosed in Japanese Laid-Open Publication No. 8-115892, for example.

In this polishing slurry recovery system, first, used polishing slurry in a slurry tank 501 is introduced into a microfiltration unit 502, thereby filtering out various contaminants in excessively large sizes of more than 500 nm and agglomerated abrasive grains from the slurry. The slurry, which contains remaining particles that have not been filtered out by a filter of the microfiltration unit 502, is returned into the tank 501 and then the slurry in the tank 501 is passed through the microfiltration unit 502 again. After the slurry has been circulated several times in this manner, the slurry with increased concentrations of large contaminants and agglomerated particles is drained as waste through a waste line.

The other part of the slurry, which has been passed through the filter of the microfiltration unit 502, is passed through a processed slurry tank 503 and then introduced into a ultrafiltration unit 504, thereby filtering out fine contaminants and fine abrasive grains in sizes of less than several tens nm from the slurry. In this case, the slurry, which contains particles that have not been filtered out by a filter of the ultrafiltration unit 504, is circulated by being returned into the processed slurry tank 503. After the slurry has been circulated several times in this manner, slurry, containing abrasive grains in sizes between several tens nm and 500 nm, is recovered with those fine contaminants and fine abrasive grains filtered out.

In the prior art polishing slurry recovery system, a considerable amount of solids, which contains large particles such as the abrasive grains and secondary particles thereof, is filtered out by the microfiltration unit 502. Thus, it is important to select an appropriate combination of pore diameters for the filters of the micro- and ultrafiltration units 502 and 504. For example, if the pore diameter of the filter for the microfiltration unit 502 was increased to avoid filter clogging, then those large particles and contaminants, which must have been filtered out otherwise, could not be filtered out, thus creating micro-scratches. Nevertheless, if the pore diameter was decreased, then as much as several tens percent of the solids containing the primary and secondary particles of the abrasive grains is captured unintentionally. As a result, those filters are clogged up and the recovery and supply of the polishing slurry come to a halt.

An exemplary countermeasure is disclosed in Japanese Laid-Open Publication No. 10-118899. In accordance with this prior art technique, a winding filter with a pore diameter of 25 to 100 μm, which is larger than the size of large particles, is used, thereby avoiding rapid clogging due to crosslinking of contaminants such as gels and yet filtering out pad debris, contaminants and large particles. According to this technique, filter clogging can be suppressed to a certain degree. However, abrasive grains, which constitute part of the solids of the large particles, are also lost at the same time.

Accordingly, every time the polishing slurry, drained from a CMP polisher, is rejuvenated in accordance with the prior art polishing slurry recovery technique, the abrasive grains in the slurry are partially lost unintentionally, thus decreasing the recovery rate of the abrasive grains.

SUMMARY OF THE INVENTION

An object of the present invention to rejuvenate used polishing slurry easily and substantially without losing abrasive grains, decreasing the polishing rate or creating micro-scratches so that the recycled polishing slurry contains abrasive grains with rejuvenated capabilities almost comparable to those of non-used, fresh polishing slurry.

To achieve this object, in the inventive method and apparatus for rejuvenating polishing slurry, large particles, which have been made up of abrasive grains agglomerated together, are re-dispersed by applying electromagnetic field or ultrasonic radiation or adding a dispersant thereto.

Specifically, an inventive method for rejuvenating a polishing slurry that has been used for a chemical-mechanical polishing process includes the steps of: a) recovering the polishing slurry; and b) re-dispersing abrasive grains contained in the polishing slurry recovered.

According to the inventive polishing slurry rejuvenating method, even if large particles have been made up of abrasive grains agglomerated together while the polishing slurry, which has been once used for chemical-mechanical polishing, is being recovered and rejuvenated, those large particles can be re-dispersed. Thus, particles in sizes suitable for the polishing process can be obtained with almost no abrasive grains lost from the polishing slurry. In this manner, the used polishing slurry can be rejuvenated easily so that the polishing slurry recovered contains abrasive grains with rejuvenated capabilities comparable to those of fresh polishing slurry.

In one embodiment of the present invention, the step b) may include the step of adding a dispersant to the polishing slurry recovered.

In this particular embodiment, the dispersant preferably includes an anionic high-molecular surfactant.

In another embodiment of the present invention, the step b) may include the step of applying an electromagnetic field to the polishing slurry recovered.

In an alternative embodiment, the step b) may include the step of applying ultrasonic radiation to the polishing slurry recovered.

In the latter embodiment, the ultrasonic radiation is preferably applied at an output power of about 400 to about 800 W and at a frequency of about 10 to about 30 kHz.

As another alternative, the method may further include the steps of: c) filtering out fine particles in sizes equal to or smaller than a lower allowable limit from the polishing slurry recovered; d) filtering out large particles in sizes equal to or greater than an upper allowable limit from the polishing slurry recovered; and e) controlling a hydrogen ion exponent (pH) of the polishing slurry recovered. All of these steps c), d) and e) are performed after the step a) has been carried out. In such an embodiment, the fine particles in various sizes equal to or smaller than the lower allowable limit and the large particles in various sizes equal to or greater than the upper allowable limit are both removed from the polishing slurry recovered. Thus, the polishing rate does not decrease or the micro-scratches are not formed, either. Furthermore, since the pH of the polishing slurry recovered is controlled, the abrasive grains contained in the polishing slurry recovered are less likely to agglomerate together during the step of re-dispersing. As a result, decrease in amount of particles is avoidable.

In this particular embodiment, the step b) is preferably performed before the step c) is carried out. Then, it is possible to prevent a microfiltration film from being clogged up while the fine particles are being filtered out from the polishing slurry recovered.

An inventive apparatus for rejuvenating a polishing slurry that has been used for a chemical-mechanical polishing process includes: means for recovering the polishing slurry; and means for re-dispersing abrasive grains contained in the polishing slurry recovered.

In one embodiment of the present invention, the re-dispersing means may re-disperse the abrasive grains by adding a dispersant to the polishing slurry recovered.

In this particular embodiment, the dispersant preferably includes an anionic high-molecular surfactant.

In another embodiment of the present invention, the re-dispersing means may re-disperse the abrasive grains by applying an electromagnetic field to the polishing slurry recovered.

In an alternative embodiment, the re-dispersing means may re-disperse the abrasive grains by applying ultrasonic radiation to the polishing slurry recovered.

In the latter embodiment, the ultrasonic radiation is preferably applied at an output power of about 400 to about 800 W and at a frequency of about 10 to about 30 kHz.

As another alternative, the apparatus may further include: means for filtering out fine particles in sizes equal to or smaller than a lower allowable limit from the polishing slurry recovered; means for filtering out large particles in sizes equal to or greater than an upper allowable limit from the polishing slurry recovered; and means for controlling a hydrogen ion exponent (pH) of the polishing slurry recovered.

In this particular embodiment, the large particle filtering means preferably includes a filter with a pore diameter between 100 $\mu$m and 200 $\mu$m, both inclusive.

DESCRIPTION OF THE PREFERRED EMBODIMENTS

Embodiment 1

First, a first exemplary embodiment of the present invention will be outlined.

Figure 1:
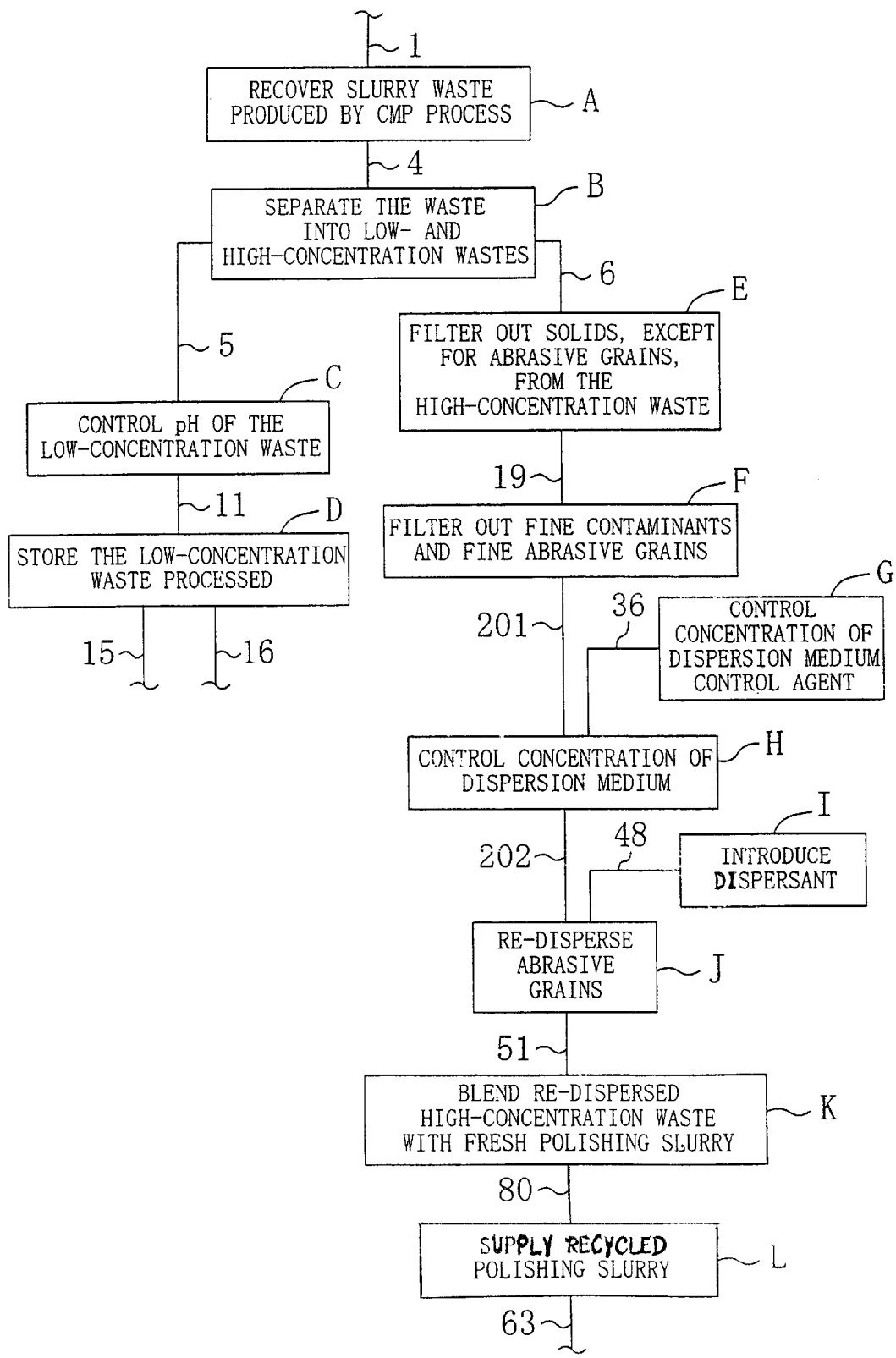
FIG. 1 illustrates a sequence of rejuvenating polishing slurry adopted in the inventive polishing slurry rejuvenating method and apparatus according to a first embodiment.

FIG. 1 illustrates a sequence of rejuvenating a polishing slurry adopted in the inventive polishing slurry rejuvenating method and apparatus according to the first embodiment. In FIG. 1, the method and apparatus includes waste recovering A, waste separating B, pH control C, low-concentration waste reservoir D, solid filtering E, fine particle filtering F, first and second concentration control G, H, dispersant introducing I, re-dispersing J, slurry blending K and recycled slurry supply L steps and sections. A slurry waste, which has been produced as a result of a CMP process, is recovered by the waste recovering section A and then separated by the waste separating section B into low- and high-concentration wastes. The waste with the lower concentration has its pH controlled by the pH control section C and then reserved in the low-concentration waste reservoir section D. On the other hand, the waste with the higher concentration has its solids, except for abrasive grains, filtered out by the solid filtering section E and then has its fine particles, i.e., fine contaminants or fine abrasive grains, filtered out by the fine particle filtering section F. Thereafter, the concentrations of a dispersion medium control agent and a dispersion medium in the high-concentration waste are controlled by the first and second concentration control sections G, H, respectively. After a dispersant has been introduced by the dispersant introducing section I into the high-concentration waste, the abrasive grains in the waste are re-dispersed by the re-dispersing section J. Then, the re-dispersed high-concentration waste is blended with non-used fresh polishing slurry by the slurry blending section K. Finally, the blended, recycled polishing slurry is supplied by the recycled slurry supply section L to the waste recovering section A.

First, polishing slurry is supplied through a slurry supply line 1 into a CMP polisher. A slurry waste, which has been produced as a result of a CMP process, is recovered by the waste recovering section A, passed through a waste line 4 and then separated by the waste separating section B into low- and high-concentration wastes. The low-concentration waste is provided to the pH control section C through a low-concentration waste line 5. After having its pH controlled by the pH control section C, the low-concentration waste is stored in the low-concentration waste reservoir section D for future use in cleaning the polishing slurry rejuvenating apparatus, for example.

The high-concentration waste, on the other hand, is fed through a high-concentration waste recovery line 6 into the solid filtering section E, which filters out its solids, except for abrasive grains, from the high-concentration waste. After having its solids filtered out, the high-concentration waste is supplied through a high-concentration waste line 19 into the fine particle filtering section F, which removes fine contaminants and fine abrasive grains therefrom through filtering. Next, the high-concentration waste, which has had its fine particles removed, is supplied through a high-concentration waste line 201 into the second concentration control section H. In the second concentration control section H, a dispersion medium control agent is introduced into the high-concentration waste to control the concentration of a dispersion medium in the high-concentration waste. After having its concentration controlled by the first concentration control section G, the dispersion medium control agent is supplied through a pressurized $N_2$ supply line 36 into the second concentration control section H.

Subsequently, the high-concentration waste, which has had the concentration of its dispersion medium controlled, is supplied through a high-concentration waste line 202 into the re-dispersing section J. The re-dispersing section J re-disperses the abrasive grains in the high-concentration waste by adding a dispersant or applying ultrasonic radiation or electromagnetic field thereto. After having been once stored in the dispersant introducing section I, the dispersant is introduced through a dispersant/pressurized $N_2$ supply line 48 into the re-dispersing section J.

Thereafter, the re-dispersed waste is supplied through a rejuvenated slurry line 51 into the slurry blending section K, which blends the re-dispersed waste with fresh polishing slurry. Finally, the blended, recycled polishing slurry is passed through a blend supply line 80 and stored in the recycled slurry supply section L.

According to the first embodiment, fumed silica particles are used as abrasive grains, 1% and 29% aqueous solutions of ammonium ($NH_3$) are used as the dispersion medium and the dispersion medium control agent, respectively, and an anionic high-molecular surfactant is used as the dispersant.

Hereinafter, specific constructions for the respective sections A through L of the polishing slurry rejuvenating apparatus according to the first embodiment and detailed contents of processing performed by these sections will be described.

Waste Recovery

Figure 2:
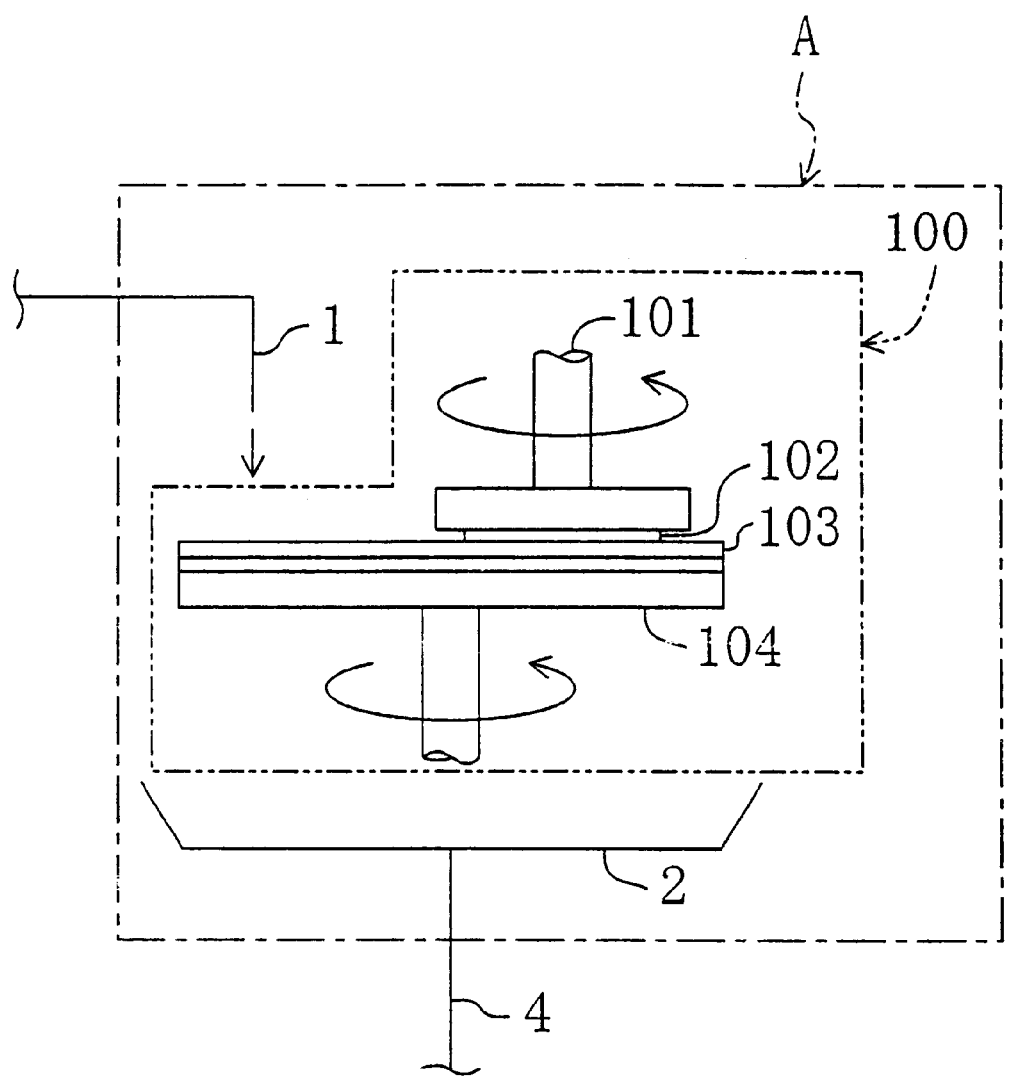
FIG. 2 illustrates a waste recovering section of the polishing slurry rejuvenating apparatus according to the first embodiment.

FIG. 2 illustrates an exemplary construction for the waste recovering section A according to the first embodiment. As shown in FIG. 2, a CMP polisher 100, which is included in the waste recovering section A, polishes a wafer 102 chemically and mechanically using a polishing slurry supplied through the slurry supply line 1. The CMP polisher 100 includes platen 104, polishing pad 103 and head 101. The polishing pad 103 is attached to the upper surface of the platen 104 and impregnated with the polishing slurry. A drive shaft is secured vertically to the lower surface of the platen 104. The head 101 has a wafer supporting plane facing the upper surface of the polishing pad 103 and a drive shaft secured vertically to the upper surface thereof. The waste recovering section A further includes a drain pan 2 and the waste line 4. The drain pan 2 is provided under the platen 104 of the CMP polisher 100 to receive the slurry waste flowing out of the platen 104. The waste line 4 is coupled to the outlet of the drain pan 2 and extends downward.

Hereinafter, it will be described how the waste recovering section A operates.

The CMP polisher 100 rotates the head 101 and platen 104 around their drive shafts in the same direction (e.g., counterclockwise as shown in FIG. 2) with the polishing slurry supplied through the slurry supply line 1 onto the polishing pad 103 and with the wafer 102 pressed between the supporting plane of the head 101 and the platen 104. In this case, the surface of the wafer to be polished is pressed against the upper surface of the polishing pad 103. Thus, that surface of the wafer 102 is polished through chemical reaction caused by the polishing slurry and mechanical action brought about by the force pressing the wafer 102 against the polishing pad 103. The slurry waste, which is produced as a result of the CMP process performed by this polisher 100, is roughly classified into high- and low-concentration wastes. Specifically, the high-concentration waste is a slurry waste, which contains various contaminants at high concentrations and is usually produced as a result of a polishing process. The low-concentration waste is a slurry waste, which contains various contaminants at low concentrations and is produced when the CMP polisher is rinsed with deionized water after the polishing process is finished.

The slurry waste, which has been produced as a result of the CMP process, is recovered into the drain pan 2 and then supplied through the waste line 4 into the waste separating section B, which separates it into the low- and high-concentration wastes as described above.

Low- and High-concentration Waste Separation

Figure 3:
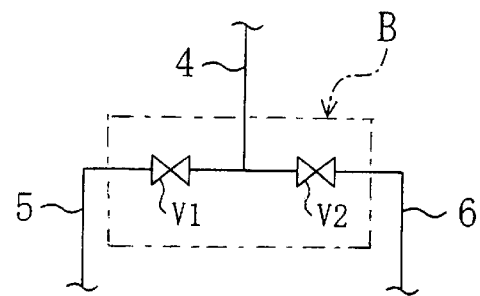
FIG. 3 illustrates a waste separating section of the polishing slurry rejuvenating apparatus according to the first embodiment.

FIG. 3 illustrates an exemplary construction for the waste separating section B according to the first embodiment. As shown in FIG. 3, the waste separating section B includes the waste line 4 and the low- and high-concentration waste recovery lines 5 and 6 coupled to the outlet of the waste line 4. A T-intersection is formed among these lines 4, 5 and 6. The waste recovery lines 5 and 6 are provided with valves V1 and V2, respectively.

The slurry waste, which has been fed into the waste separating section B through the waste line 4, is separated into low- and high-concentration wastes by selectively opening or closing the valve V1 or V2. As described above, it depends on the process being carried out in the CMP polisher 100 whether the slurry waste supplied from the CMP polisher 100 is at low or high concentration. Accordingly, while a process involving the low-concentration waste is being carried out, the valve V1 is opened but the valve V2 is closed. On the other hand, while a process involving the high-concentration waste is being carried out, the valve V1 is closed but the valve V2 is opened. As a result, the slurry waste is separable into the low- and high-concentration wastes. As can be seen, the waste separating section B is controlled in conjunction with the CMP polisher 100. In this manner, a sequence control is realized such that about 80% of the polishing slurry that has been used for the polishing process is recovered as the high-concentration waste.

Low-concentration Waste Processing

Figure 4:
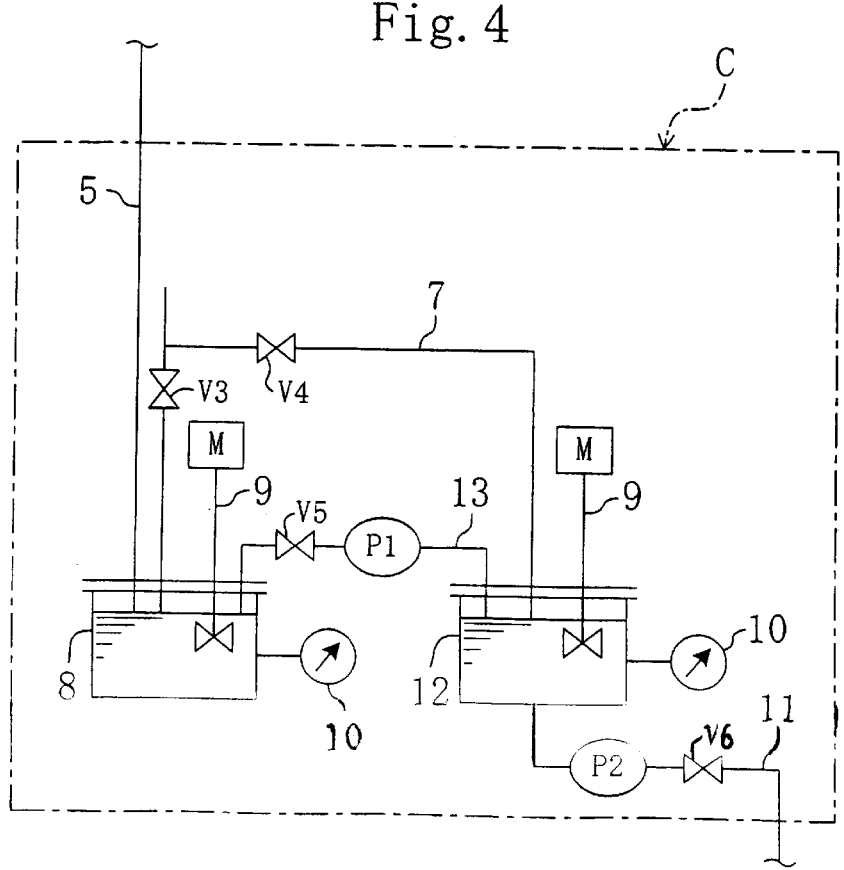
FIG. 4 illustrates a pH control section of the polishing slurry rejuvenating apparatus according to the first embodiment.

FIG. 4 illustrates an exemplary construction for the pH control section C according to the first embodiment. As shown in FIG. 4, the pH control section C includes first and second neutralizing tanks 8 and 12. The first neutralizing tank 8 is coupled to the low-concentration waste recovery line 5 at the incoming end. The second neutralizing tank 12 is coupled to the processed low-concentration waste line 11, including a pump P2 and a valve V6, at the outgoing end.

The first and second neutralizing tanks 8 and 12 are coupled together by way of a low-concentration waste line 13 including a pump P1 and a valve V5. The first and second neutralizing tanks 8 and 12 are coupled to neutralizing agent introducing lines 7, including valves V3 and V4, respectively, at their incoming ends. A stirrer 9 and a pH meter 10 are further provided for each of the first and second neutralizing tanks 8 and 12.

Hereinafter, it will be described how the pH control section C operates.

First, the low-concentration waste, which has been separated from the slurry waste by the waste separating section B shown in FIG. 3, is introduced into the first neutralizing tank 8 shown in FIG. 4 by way of the low-concentration waste recovery line 5. The low-concentration waste, which has been introduced into the first neutralizing tank 8, is stirred up by the stirrer 9, and at the same time, neutralized by being supplied with a neutralizing agent through the neutralizing agent introducing line 7. In the illustrated embodiment, an aqueous solution of ammonium is used as the dispersion medium for the polishing slurry, and therefore sulfuric acid is used as the neutralizing agent. When an acidic solution is used as the dispersion medium, an aqueous solution of sodium hydroxide (NaOH) is used as the neutralizing agent. In this neutralization process, the valve V3 is selectively opened or closed and the amount of the neutralizing agent added is controlled by monitoring the pH of the low-concentration waste on the pH meter 10. In this manner, the neutralization process can be performed precisely according to this embodiment.

Having been neutralized in the first neutralizing tank 8, the low-concentration waste is introduced through the low-concentration waste line 13 into the second neutralizing tank 12. The neutralization process is monitored and the pH is controlled in the second neutralizing tank 12 in the same way as in the first neutralizing tank 8. After having been neutralized sufficiently, the processed low-concentration waste is pumped out by the pump P2 and supplied through the processed low-concentration waste line 11 into a water reservoir tank 14 for back-washing the rejuvenating apparatus.

How to Use Low-concentration Waste Processed

Figure 5:
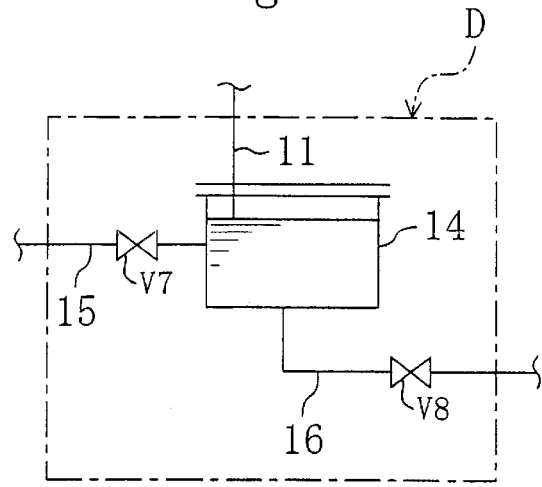
FIG. 5 illustrates a low-concentration waste reservoir section of the polishing slurry rejuvenating apparatus according to the first embodiment.

FIG. 5 illustrates an exemplary construction for the low-concentration waste reservoir section D according to the first embodiment. As shown in FIG. 5, the low-concentration waste reservoir section D includes the water reservoir 14 for back-washing the rejuvenating apparatus. The water reservoir 14 is coupled to the processed low-concentration waste line 11 at the incoming end and to a drainage line 15 and a water supply line 16 at the outgoing end. The drainage and water supply lines 15 and 16 are provided with valves V7 and V8, respectively. And water for use in back-washing the rejuvenating apparatus is supplied through the line 16.

As shown in FIG. 5, the processed low-concentration waste is introduced through the processed low-concentration waste line 11 into, and stored in, the water reservoir 14. The processed low-concentration waste stored contains contaminants at reduced concentrations and is neutral, and therefore, is usable for back-washing the filter of the rejuvenating apparatus or rinsing respective tanks and pipes.

Specifically, the processed low-concentration waste is delivered through the supply line 16 and used for rinsing waste buffer tank 17, filter 18, waste tank 20, circulating/temperature-control/filtering line 22, dispersion medium pH control tank 26, re-dispersion tank 45, fresh slurry/rejuvenated slurry blending tank 53, supplied slurry stirring and circulating line 62, slurry supply line 63 and microfiltration film 68. Furthermore, any part of the rejuvenating apparatus according to the first embodiment such as pipe, tank or filter that comes into contact with the slurry is washable with the processed low-concentration waste. It should be noted that the processed low-concentration waste is drained through the drainage line 15.

Removal of Large Contaminants from High-concentration Waste

Figure 6:
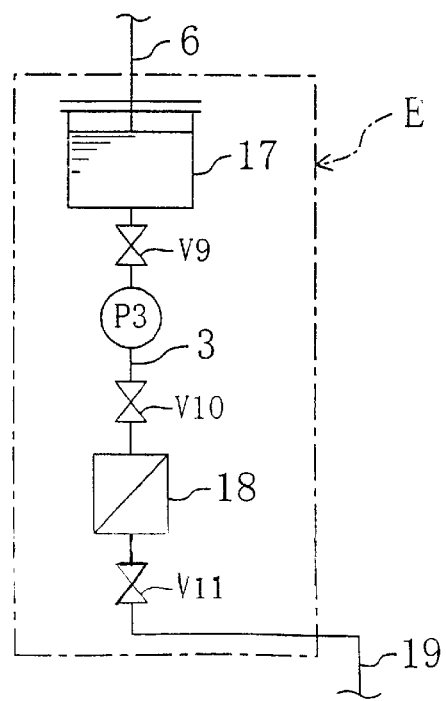
FIG. 6 illustrates a solid filtering section of the polishing slurry rejuvenating apparatus according to the first embodiment.

FIG. 6 illustrates an exemplary construction for the solid filtering section E according to the first embodiment. As shown in FIG. 6, the solid filtering section E includes a waste buffer tank 17 and a filter 18. The waste buffer tank 17 is coupled to the high-concentration waste recovery line 6 at the incoming end. The filter 18 is coupled to a high-concentration waste line 19, including a valve V11, at the outgoing end. The waste buffer tank 17 and the filter 18 are coupled together by way of a high-concentration waste line 3, which is provided with a valve V9, a pump P3 and another valve V10 that are connected to each other in this order. That is to say, the valve V9 is closest to the tank 17 and the valve V10 is closest to the filter 18.

Hereinafter, it will be described how the solid filtering section E operates.

The high-concentration waste, which has been separated from the slurry waste by the waste separating section B shown in FIG. 3, is introduced through the waste recovery line 6 into the waste buffer tank 17 shown in FIG. 6. At a point in time the high-concentration waste has been accumulated to a predetermined volume, the high-concentration waste in the tank 17 is pumped into the filter 18 by running the pump P3. The filter 18 filters out large contaminants, which adversely affect the performance of polishing, from the high-concentration waste, except for the abrasive grains contained in the polishing slurry. Those large contaminants include pad debris produced during pad conditioning and swarf of the workpiece. In the illustrated embodiment, the pore diameter of the filter 18 is about 120 μm. As described above, since the diameter of secondary silica particles, which are abrasive grains contained in the polishing slurry, is about 200 nm, particles mainly composed of those abrasive grains are hardly filtered out. Accordingly, even if the high-concentration waste is filtered through the filter 18, less than 1% of the abrasive grains are lost. The pore diameter of the filter 18 is preferably between 100 and 200 μm, both inclusive.

Removal of Fine Contaminants and Fine Abrasive Grains

Figure 7:
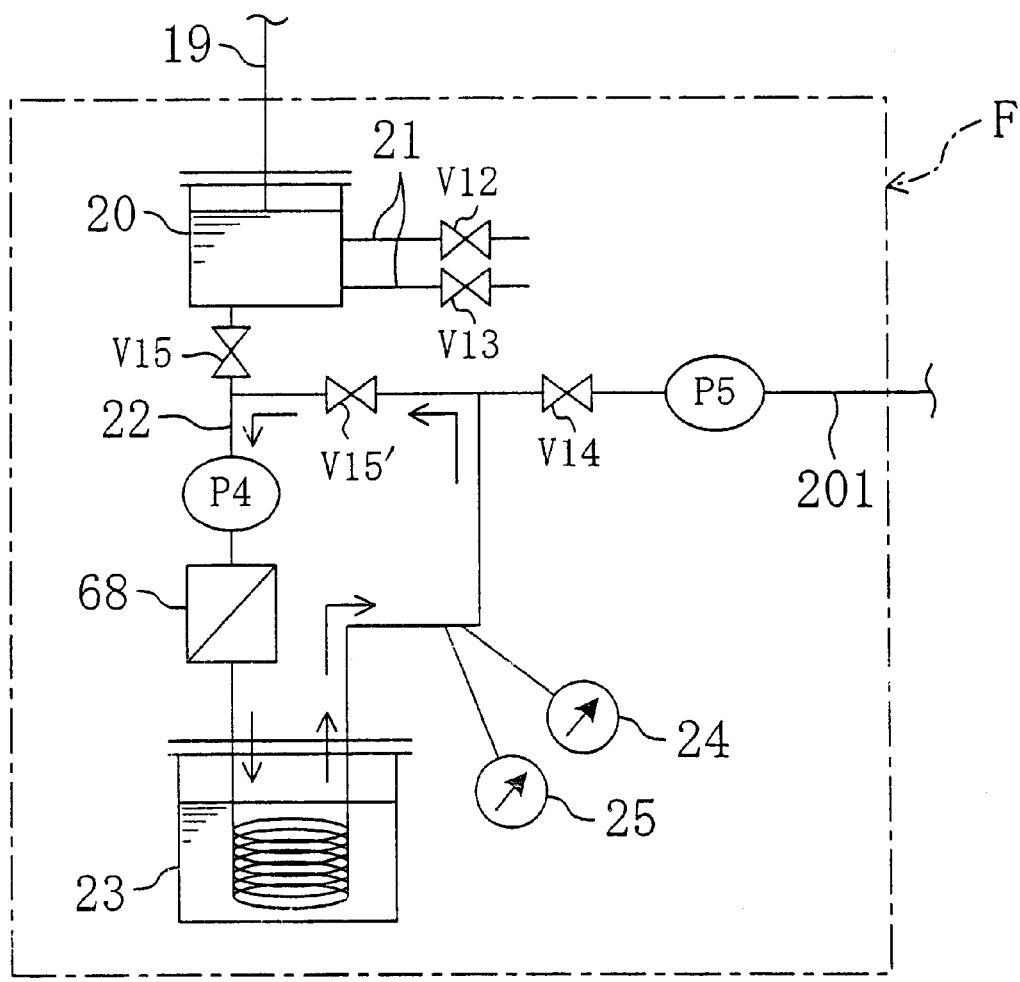
FIG. 7 illustrates a fine particle filtering section of the polishing slurry rejuvenating apparatus according to the first embodiment.

FIG. 7 illustrates an exemplary construction for the fine particle filtering section F according to the first embodiment. As shown in FIG. 7, the fine particle filtering section F includes waste tank 20, microfiltration film 68, heat exchange tank 23 and circulating/temperature-controlling/filtering line 22. The microfiltration film 68 is made of a hollow fiber membrane with a pore diameter of 0.25 μm and filters the waste supplied from the waste tank 20. The heat exchange tank 23 is provided to regulate the temperature of the filtered waste. And the line 22 is provided to circulate the filtered waste between the microfiltration film 68 and the heat exchange tank 23.

The waste tank 20 is coupled not only to the high-concentration waste line 19 at the incoming end, but also to the line 22 at the outgoing end by way of a valve V15. One side of the waste tank 20 is provided with two sampling ports 21, which are located about 10 cm below the surface of the waste and about 5 cm above the bottom of the tank 20, respectively, and their associated valves V12 and V13 to monitor a change in composition of the waste.

The line 22 forms a closed loop with a pump P4 interposed between the valve V15 and the microfiltration film 68 and with another valve V15' interposed between the outlet of the heat exchange tank 23 and the pump P4. A solid concentration meter 24 and a slurry thermometer 25 are provided between the heat exchange tank 23 and the valve V15'. The line 22 is coupled to the dispersion medium pH control tank 26 (that will be described later) by way of a high-concentration waste line 201 including a valve V14 and a pump P5.

Hereinafter, it will be described how the fine particle filtering section F operates.

First, the high-concentration waste, which has had its large contaminants removed by the solid filtering section E shown in FIG. 6, is introduced through the high-concentration waste line 19 shown in FIG. 7 into the waste tank 20. Then, the high-concentration waste, which has been delivered from the waste tank 20, is compulsorily circulated in the line 22 using the pump P4, thereby stirring up the high-concentration waste. Also, in this case, fine contaminants and fine particles of degraded abrasive grains are removed from the high-concentration waste by getting the high-concentration waste filtered through the microfiltration film 68.

Moreover, since the composition of slurry is changeable with temperature, the temperature of the high-concentration waste should be regulated using the heat exchange tank 23. Specifically, if the temperature of the slurry has fallen excessively, then the slurry is gelled and cannot be rejuvenated anymore. Also, if the temperature of the slurry has risen or fallen too much, then the dispersion medium such as $NH_3$ becomes unstable, thus often agglomerating the abrasive grains. Accordingly, to avoid the gelation at a low temperature or agglomeration at a high temperature, the temperature of the high-concentration waste is controlled and optimized using the slurry thermometer 25 and the concentration of solids in the high-concentration waste is controlled and optimized using the solid concentration meter 24.

Concentration Control of Dispersion Medium Control Agent

Figure 8:
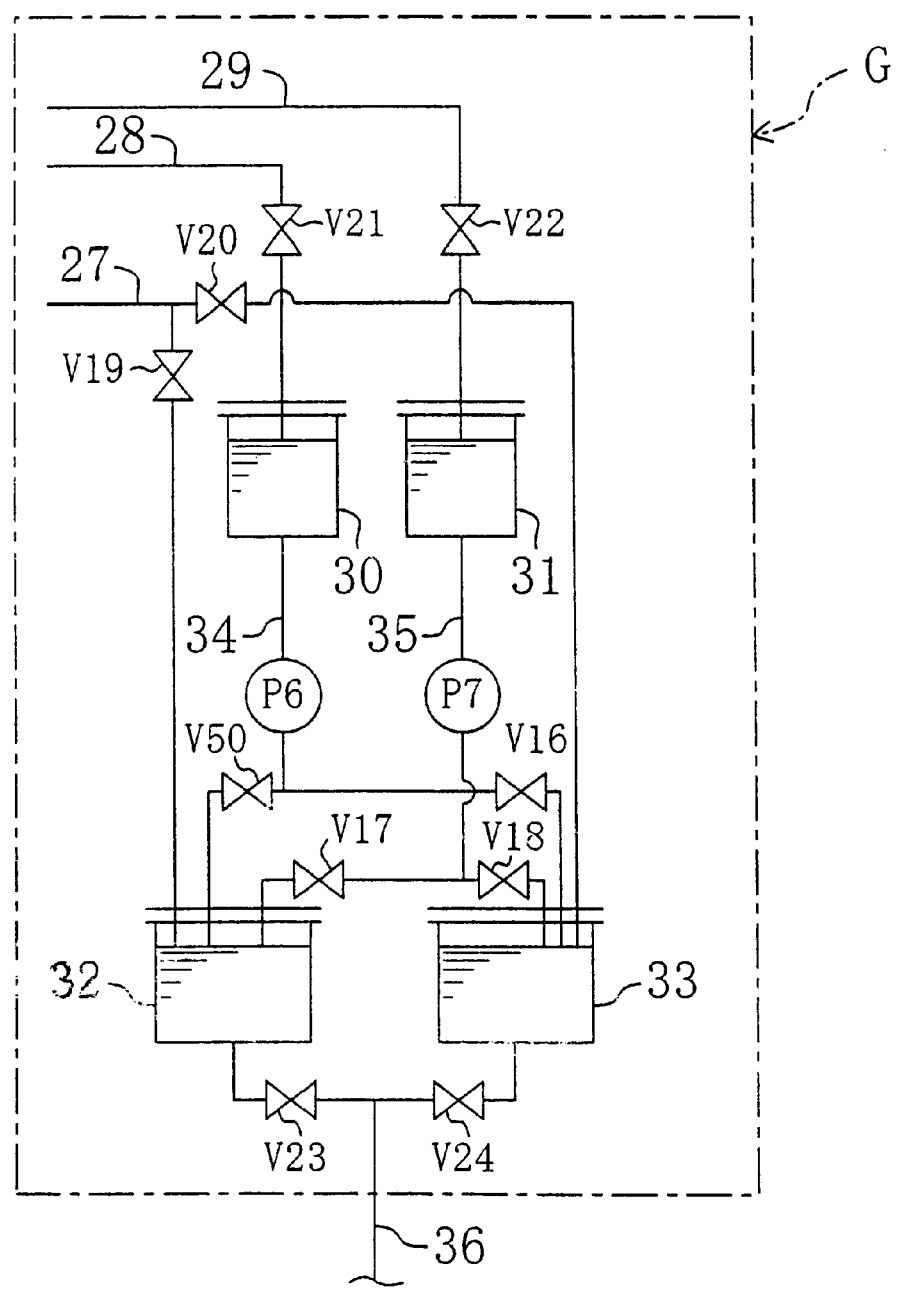
FIG. 8 illustrates a first concentration control section for controlling the concentration of a dispersion medium control agent in the polishing slurry rejuvenating apparatus according to the first embodiment.

FIG. 8 illustrates an exemplary construction for the first concentration control section G for controlling the concentration of a dispersion medium control agent according to the first embodiment. As shown in FIG. 8, the first concentration control section G includes dilute buffer tank 30, dispersion medium control agent buffer tank 31 and first and second dispersion medium diluting/supplying tanks 32 and 33.

The dilute buffer tank 30 is coupled to a diluting agent introducing line 28, including a valve V21, at the incoming end and to a first continuous flow line 34, including a metering pump P6 and valves V50 and V16, at the outgoing end.

The dispersion medium control agent buffer tank 31 is coupled to a dispersion medium control agent introducing line 29, including a valve V22, at the incoming end and to a second continuous flow line 35, including a metering pump P7 and valves V17 and V18, at the outgoing end.

The first dispersion medium diluting/supplying tank 32 is coupled to an $N_2$ supply line 27, including a valve V19, at the incoming end, to the first and second continuous flow lines 34 and 35 and to a pressurized $N_2$ supply line 36, including a valve V23, at the outgoing end.

The second dispersion medium diluting/supplying tank 33 is coupled to the $N_2$ supply line 27, including a valve V20, at the incoming end, to the first and second continuous flow lines 34 and 35 and to the pressurized $N_2$ supply line 36, including a valve V24, at the outgoing end. These two tanks 32 and 33 are provided such that one of the tanks 32 and 33 can be subjected to maintenance, for example.

To prevent decrease in amount of abrasive grains, which are solids in the rejuvenated polishing slurry, the concentration (or the pH) of the dispersion medium (i.e., aqueous solution of $NH_3$ in this case) in the slurry should be controlled. Accordingly, an agent for controlling the concentration of the dispersion medium, i.e., a dispersion medium control agent (29% aqueous solution of $NH_3$ in this case), should be added to the high-concentration waste. For that reason, the first concentration control section G controls the concentration of the dispersion medium control agent in the rejuvenating apparatus according to the first embodiment.

Hereinafter, it will be described how the first concentration control section G operates.

A diluting agent, which has been introduced through the diluting agent introducing line 28 to control the concentration, is temporarily reserved in the dilute buffer tank 30. In the same way, a dispersion medium control agent, which has been introduced through the dispersion medium control agent introducing line 29, is temporarily stored in the control agent buffer tank 31. Thereafter, the diluting agent and dispersion medium control agent are pumped out by the metering pumps P6 and P7 into the dispersion medium control agent diluting/supplying tanks 32 and 33 through the continuous flow lines 34 and 35, respectively. The dispersion medium control agent, which has had its concentration controlled at an appropriate value in the dispersion medium control agent diluting/supplying tanks 32 and 33, is pressurized with nitrogen ($N_2$) gas supplied through the $N_2$ supply line 27 and then delivered to the dispersion medium pH control tank 26 through the pressurized $N_2$ supply line 36.

Concentration Control of Dispersion Medium

Figure 9:
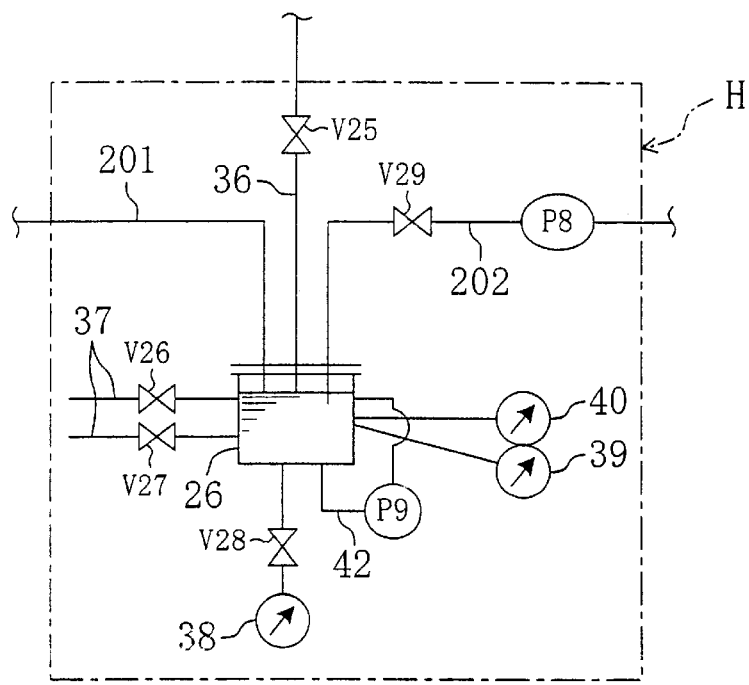
FIG. 9 illustrates a second concentration control section for controlling the concentration of a dispersion medium in the polishing slurry rejuvenating apparatus according to the first embodiment.

FIG. 9 illustrates an exemplary construction for the second concentration control section H for controlling the is concentration of the dispersion medium according to the first embodiment. As shown in FIG. 9, the second concentration control section H includes the dispersion medium pH control tank 26. The tank 26 is coupled to the pressurized $N_2$ supply line 36, including a valve V25, and the high-concentration waste line 201 at the incoming end and to the high-concentration waste line 202, including a valve V29 and a pump P8, at the outgoing end.

A stirring/circulating line 42 with a pump P9, a dispersion medium concentration meter 39, a solid concentration meter 40 and a zeta potentiometer 38 with a valve V28 are attached to the dispersion medium pH control tank 26. One side of the tank 26 is provided with two sampling ports 37, which are located about 10 cm below the surface of the waste and about 5 cm above the bottom of the tank 26, respectively, and their associated valves V26 and V27 to monitor the composition of the high-concentration waste controlled. It should be noted that the zeta potentiometer 38 is provided to measure a so-called zeta (ζ) potential, which is an electrokinetic potential between the surface of a solid particle and the liquid component of the high-concentration waste.

Hereinafter, it will be described how the second concentration control section H operates.

First, the high-concentration waste, which has been processed by the fine particle filtering section F shown in FIG. 7, is pumped by the pump P5 into the dispersion medium pH control tank 26 through the high-concentration waste line 201 shown in FIG. 9.

Then, the dispersion medium control agent is introduced through the pressurized $N_2$ supply line 36 into the dispersion medium pH control tank 26 to control the concentration (or the pH) of the dispersion medium. In this case, the high-concentration waste is stirred up by being circulated through the stirring/circulating line 42 and the concentration of the dispersion medium in the waste is monitored using the dispersion medium concentration meter 39. The concentration of the dispersion medium is controlled by performing a feedback control on the amount of the dispersion medium control agent to be added based on the monitored concentration of the dispersion medium. In addition, a variation in composition of the high-concentration waste, which is caused by the change in concentration of the dispersion medium, is monitored using the zeta potentiometer 38. Furthermore, a variation in concentration of solids, which is brought about by the addition of the dispersion medium control agent, is also monitored using the solid concentration meter 40. It should be noted that the dispersion medium concentration meter 39 is replaceable with a pH meter.

Dispersant Introducing Section

Figure 10:
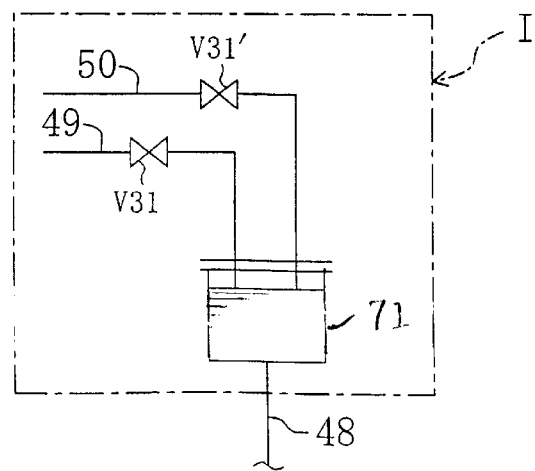
FIG. 10 illustrates a dispersant introducing section in the polishing slurry rejuvenating apparatus according to the first embodiment.

FIG. 10 illustrates an exemplary construction for the dispersant introducing section I according to the first embodiment. As shown in FIG. 10, the dispersant introducing section I includes a dispersant reservoir tank 71. The tank 71 is coupled to a dispersant/pressurized $N_2$ supply line 48 at the outgoing end and to pressurized $N_2$ and dispersant introducing lines 49 and 50, including valves V31 and V31', respectively, at the incoming end.

The dispersant (e.g., an anionic high-molecular surfactant) that will be used in the re-dispersing process step is introduced through the dispersant introducing line 50 and stored in the dispersant reservoir tank 71. Then, this dispersant will be passed through the dispersant/pressurized $N_2$ supply line 48 into the re-dispersion tank 45 while being pressurized with nitrogen gas supplied through the pressurized $N_2$ introducing line 49.

Re-dispersing Process

Figure 11:
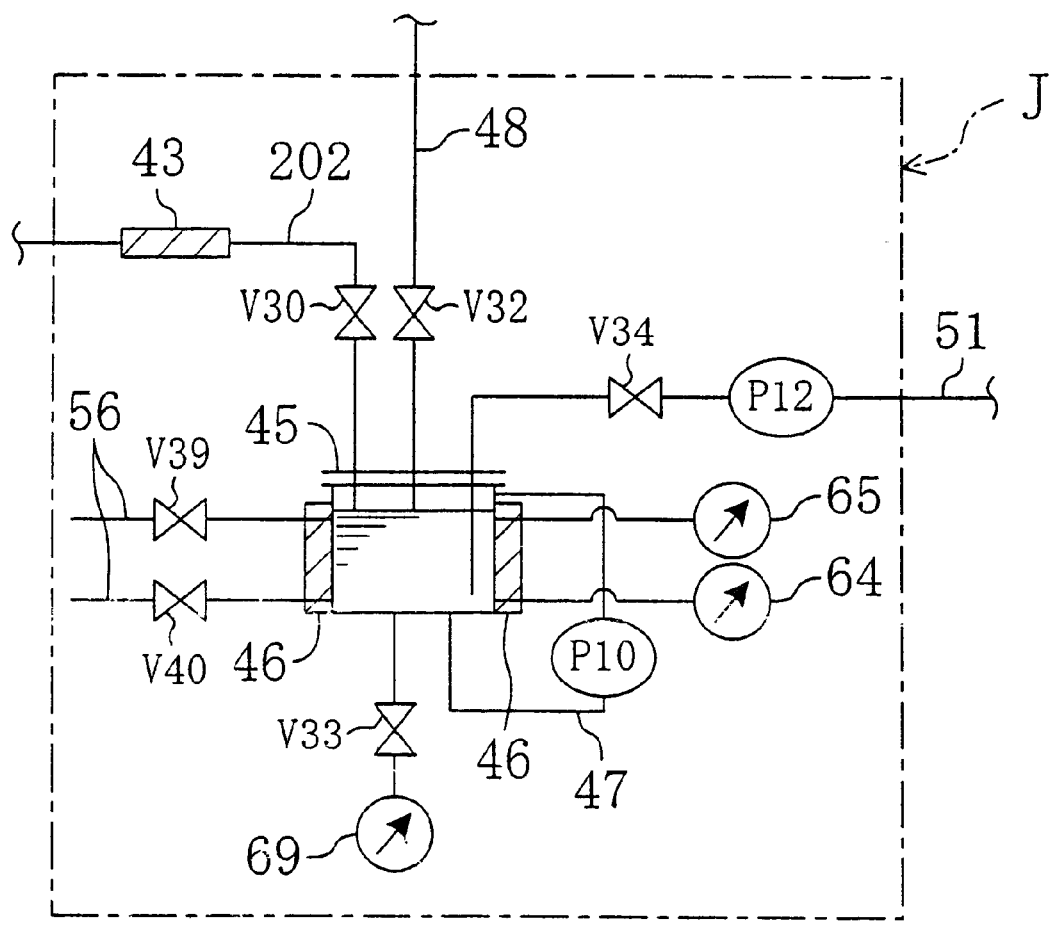
FIG. 11 illustrates a re-dispersing section in the polishing slurry rejuvenating apparatus according to the first embodiment.

FIG. 11 illustrates an exemplary construction for the re-dispersing section J according to the first embodiment. As shown in FIG. 11, the re-dispersing section J includes the re-dispersion tank 45. The re-dispersion tank 45 is coupled to the high-concentration waste line 202 and the dispersant/pressurized $N_2$ supply line 48 at the incoming end and to a rejuvenated slurry line 51 at the outgoing end. The high-concentration waste line 202 includes an electromagnetic processor 43 and a valve V30. The dispersant/pressurized $N_2$ supply line 48 includes a valve V32. And the rejuvenated slurry line 51 includes a valve V34 and a pump P12.

A stirring/circulating line 47 with a pump P10, a particle size distribution analyzer 64, a solid concentration meter 65 and a zeta potentiometer 69 with a valve V33 are attached to the re-dispersion tank 45. An ultrasonic generator 46 is also attached to the sidewall of the re-dispersion tank 45. One side of the re-dispersion tank 45 is provided with two sampling ports 56, which are located about 10 cm below the surface of the re-dispersed and rejuvenated slurry and about 5 cm above the bottom of the tank 45, respectively, and their associated valves V39 and V40 to monitor the composition of the re-dispersed and rejuvenated slurry.

According to this embodiment, large particles, which are formed as a result of agglomeration of secondary particles of abrasive grains, are not filtered out, but re-dispersed and broken down into primary or secondary particles. Thus, almost all (e.g., 98% or more) of the abrasive grains contained in the waste are recyclable. In addition, clogging of the filter 55 is also avoidable as will be described later.

In the illustrated embodiment, electromagnetic field and/or ultrasonic radiation are/is applied and/or a dispersant is added to carry out the re-dispersion process efficiently.

Hereinafter, it will be described how the re-dispersing section J operates.

First, the high-concentration waste, which has had the concentration of its dispersion medium controlled by the second concentration control section H shown in FIG. 9, is pumped out by the pump P8 from the dispersion medium pH control tank 26 into the re-dispersion tank 45 shown in FIG. 11 through the high-concentration waste line 202. In this case, the large particles of abrasive grains contained in the high-concentration waste are re-dispersed by electromagnetic field applied from the electromagnetic processor 43 while the waste is passing through the high-concentration waste line 202.

Next, those large particles of abrasive grains in the high-concentration waste that has been introduced into the re-dispersion tank 45 are further re-dispersed by the ultrasonic radiation emitted from the ultrasonic generator 46 provided on the sidewall of the re-dispersion tank 45. In the illustrated embodiment, the ultrasonic radiation is preferably applied at an output power between about 400 and about 800 W and at an oscillation frequency between about 10 and about 30 kHz.

Furthermore, the dispersant is also introduced through the dispersant/pressurized $N_2$ supply line 48 into the high-concentration waste to a concentration between about 0.1 and about 2 percent by weight (e.g., 0.5 wt %). This dispersant can disperse those agglomerated particles from each other by changing the charged states of the particles. Accordingly, the large particles in the high-concentration waste are re-dispersed even more uniformly due to the injection of the dispersant. In addition, the dispersant can effectively suppress the agglomeration of particles by increasing the zeta potential of the particles. Thus, by using the dispersant, it is also possible to prevent the re-dispersed abrasive grains from re-agglomerating together.

In the illustrated embodiment, an anionic high-molecular surfactant is used as the dispersant. Alternatively, if colloidal silica particles are used as the abrasive grains, the re-dispersion is realizable just by adding deionized water and there is no need to add any dispersant.

Moreover, by running the pump P10 in the stirring/circulating line 47 attached to the re-dispersion tank 45, the agglomeration and sedimentation of particles can be suppressed in the entire high-concentration waste and the large particles can be maintained in a re-dispersed state with much more certainty. In this manner, those particles can be dispersed just like the abrasive grains contained in non-used polishing slurry.

Also, the effects of the re-dispersion process on the high-concentration waste can be checked without sampling using the zeta potentiometer 69, particle size distribution analyzer 64 and solid concentration meter 65 provided for the re-dispersion tank 45.

We analyzed the effects of ultrasonic radiation on the re-dispersion using the particle size distribution analyzer 64. Hereinafter, results of our experiments will be described with reference to the accompanying drawings.

Figure 12:
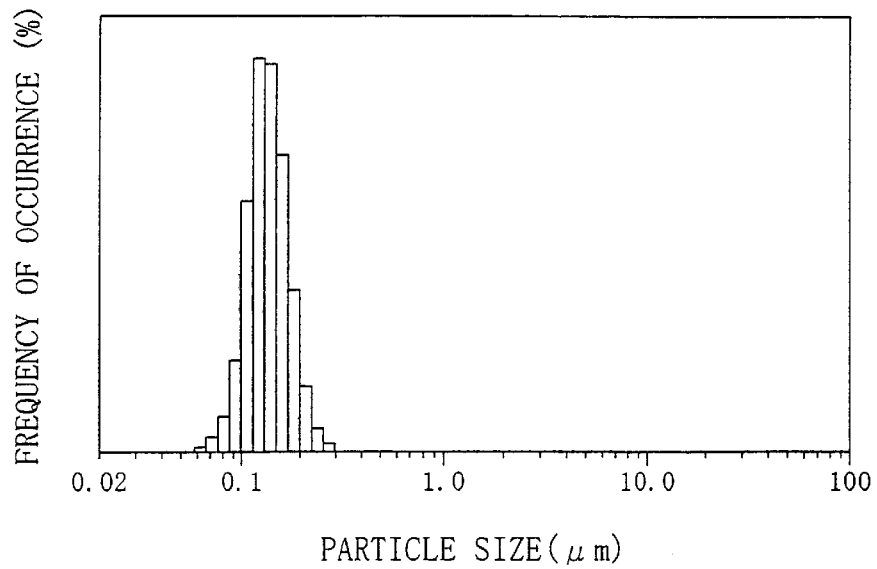
FIG. 12 is a graph illustrating a particle size distribution in a non-used polishing slurry for the polishing slurry rejuvenating apparatus according to the first embodiment.
Figure 13:
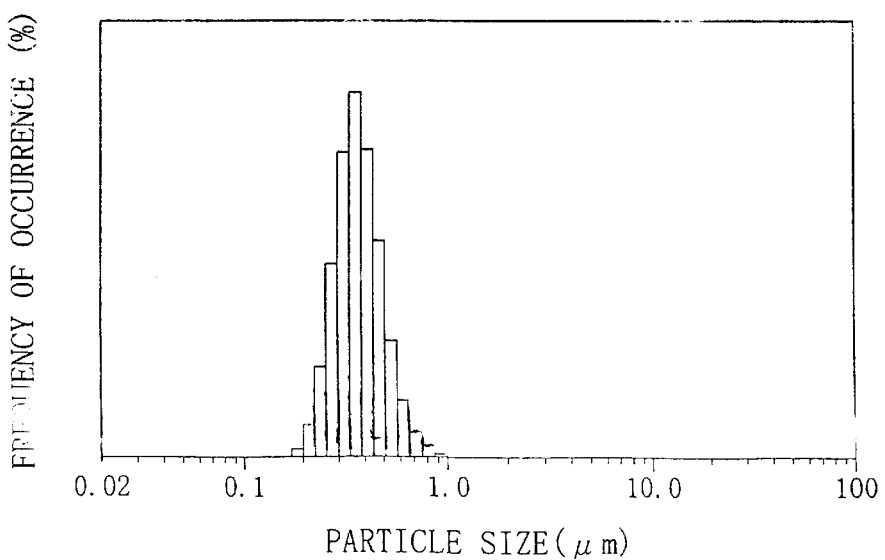
FIG. 13 is a graph illustrating a particle size distribution in a polishing slurry, which has been circulated through a stirring/circulating line for 6 hours, for the polishing slurry rejuvenating apparatus according to the first embodiment.

FIG. 12 illustrates a particle size distribution in a non-used polishing slurry. As can be seen from FIG. 12, the particle size distribution is not so dispersed as for the non-used slurry and has a median size of 0.135 µm. FIG. 13 illustrates a particle size distribution in a polishing slurry, which has been circulated through the stirring/circulating line 47 for 6 hours. As shown in FIG. 13, the particle size distribution is slightly more dispersed compared to FIG. 12 and has a median size of 0.370 µm, which is greater compared to FIG. 12. This is because an increasing number of particles agglomerate together with time.

Figure 14:
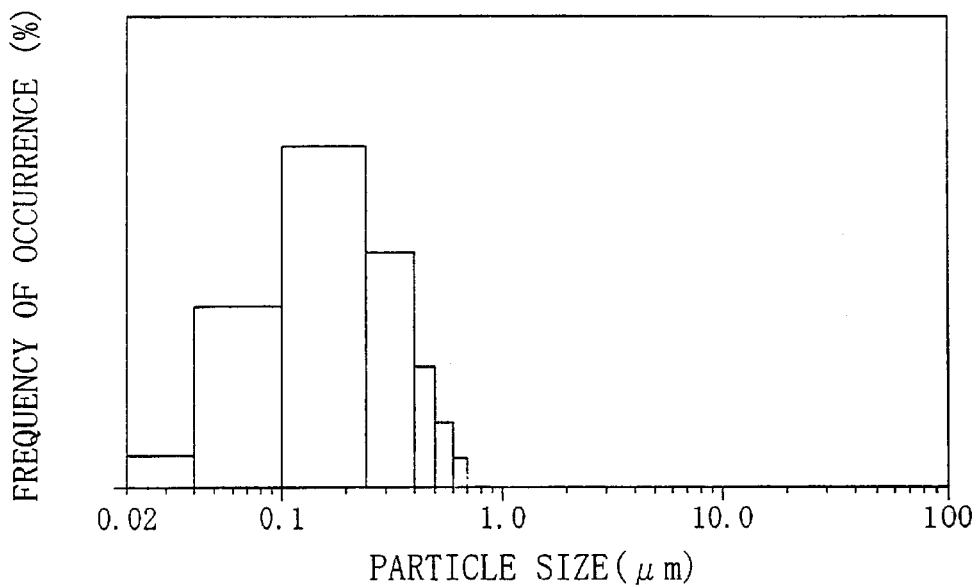
FIG. 14 is a graph illustrating a particle size distribution in a polishing slurry, which has been circulated through a stirring/circulating line for 6 hours and then applied with ultrasonic radiation, for the polishing slurry rejuvenating apparatus according to the first embodiment.

FIG. 14 illustrates a particle size distribution obtained by applying ultrasonic radiation to the polishing slurry shown in FIG. 13 at an output power of 600 W and at an oscillation frequency between 10 and 30 kHz for seven minutes. As can be seen from FIG. 14, the particle size distribution is not so dispersed as the case illustrated in FIG. 13 and has a median size of 0.15 µm, which is smaller compared to FIG. 13. Thus, it can be seen that the particles, which once agglomerated together in the slurry, have been re-dispersed due to the application of ultrasonic radiation. In addition, the particle size distribution in the polishing slurry that has been applied with the ultrasonic radiation is similar to that of the non-used polishing slurry. Accordingly, it can also be seen that the re-dispersion process using ultrasonic radiation can rejuvenate the waste into polishing slurry with polishing capabilities comparable to those of the non-used one.

In this manner, according to the present invention, polishing slurry, which contains abrasive grains with polishing capabilities almost equal to those of fresh slurry, can be rejuvenated easily from the used polishing slurry substantially without losing abrasive grains, decreasing the polishing rate or causing micro-scratches.

Figure 15:
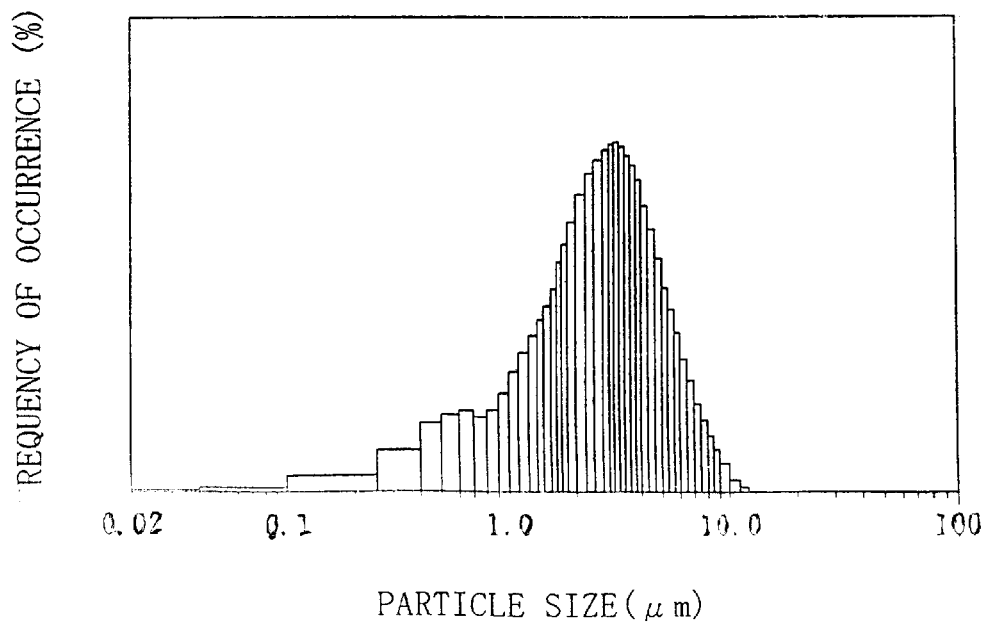
FIG. 15 is a graph illustrating a particle size distribution in a polishing slurry, which has been circulated through a stirring/circulating line for several days on end without being subjected to the re-dispersion process, for the polishing slurry rejuvenating apparatus according to the first embodiment.

FIG. 15 illustrates a particle size distribution in a polishing slurry, which has been circulated through the stirring/circulating line 47 for several days on end without being applied with any electromagnetic field or ultrasonic radiation and without being provided with any dispersant. As can be seen from FIG. 15, the particle size distribution is dispersed most among the four cases illustrated in FIGS. 12 through 15, and has a median size of 2.43 µm, which is also the largest among these four cases. Accordingly, the conventional polishing slurry recovery system, in which the re-dispersion process is not performed, is not qualified for recycling a polishing slurry.

Next, it will be described how the size of particles in a polishing slurry changes with time if the slurry is circulated in a line.

Figure 16:
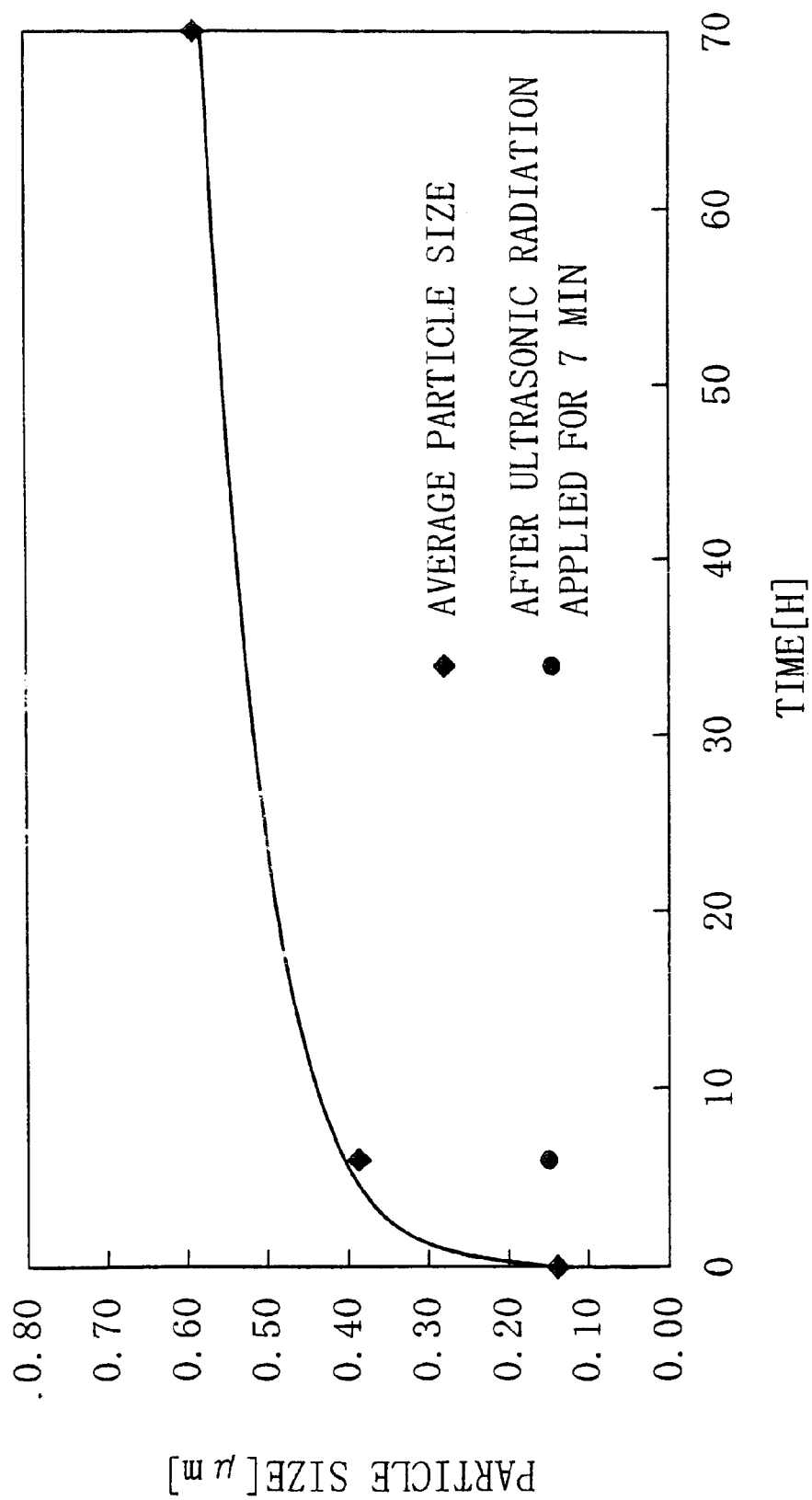
FIG. 16 is a graph illustrating how the size of particles in a slurry changes with time in a situation where the polishing slurry rejuvenating apparatus according to the first embodiment is not used and in a situation where the apparatus is used.

FIG. 16 illustrates a change in size of particles in slurry with time. As shown in FIG. 16, the longer the slurry is left, the greater the size of abrasive grains. Since the maximum size of particles usable as abrasive grains is 0.45 µm, the polishing slurry is usable within 12 hours of circulation. In the inventive rejuvenating apparatus, however, the average size of particles can be reduced even in a waste that has already been used for several hours by carrying out the re-dispersion process. Accordingly, even a waste, which is non-usable according to the conventional technique because the rejuvenation process is started too late or because the waste has been stored in the apparatus for too long a time, can be rejuvenated into usable polishing slurry by the inventive rejuvenating method and apparatus.

Fresh Slurry/Rejuvenated Slurry Blending Tank

Figure 17:
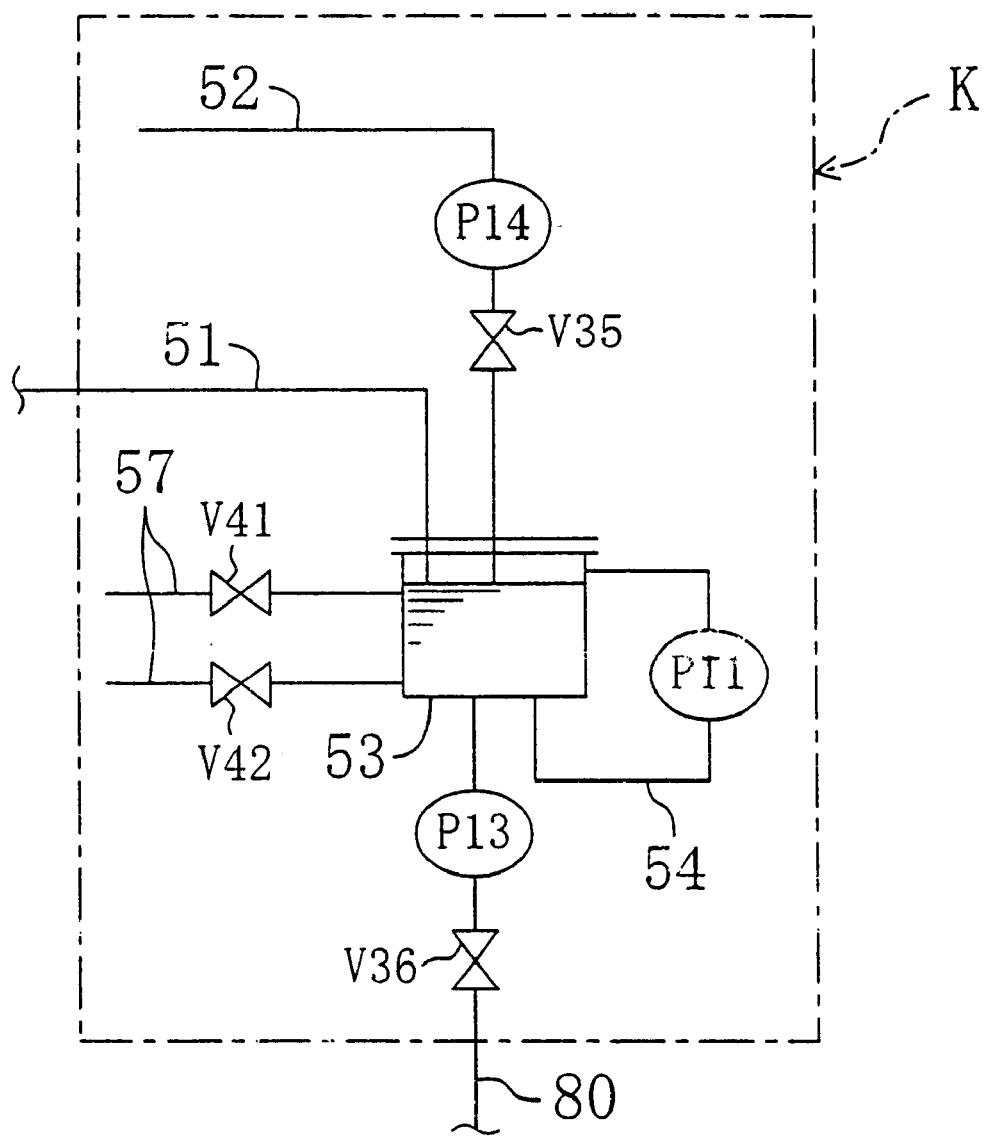
FIG. 17 illustrates a slurry blending section in the polishing slurry rejuvenating apparatus according to the first embodiment.

FIG. 17 illustrates an exemplary construction for the slurry blending section K according to the first embodiment. As shown in FIG. 17, the slurry blending section K includes a fresh slurry/rejuvenated slurry blending tank 53. In this specification, the re-dispersed high-concentration waste is called "rejuvenated slurry". The tank 53 is coupled to the rejuvenated slurry line 51 and a fresh slurry introducing line 52 at the incoming end and to a blend supply line 80 at the outgoing end. The fresh slurry introducing line 52 includes a pump P14 and a valve V35, while the blend supply line 80 includes a pump P13 and a valve V36.

A stirring/circulating line 54 with a pump P11 is attached to the fresh slurry/rejuvenated slurry blending tank 53. One side of the tank 53 is provided with two sampling ports 57, which are located about 10 cm below the surface of the blend and about 5 cm above the bottom of the tank 53, respectively, and their associated valves V41 and V42 to monitor the composition of the rejuvenated slurry blended.

The rejuvenated slurry should contain a predetermined amount or more of abrasive grains to be usable as a polishing slurry. Accordingly, the slurry blending section K blends the rejuvenated slurry with a non-used, fresh polishing slurry.

Hereinafter, it will be described how the slurry blending section K operates.

First, the rejuvenated slurry, which has been subjected to the re-dispersing section J shown in FIG. 11, is pumped out by the pump P12 into the fresh slurry/rejuvenated slurry blending tank 53 shown in FIG. 17 through the rejuvenated slurry line 51. In the tank 53, the non-used polishing slurry, which has been introduced through the fresh slurry introducing line 52 via the pump P14, is mixed with the rejuvenated slurry. In the illustrated embodiment, the rejuvenated slurry is stirred up and mixed with the fresh slurry in the blending tank 53 by running the pump P11 of the stirring/circulating line 54.

How to Supply Recycled Polishing Slurry

Figure 18:
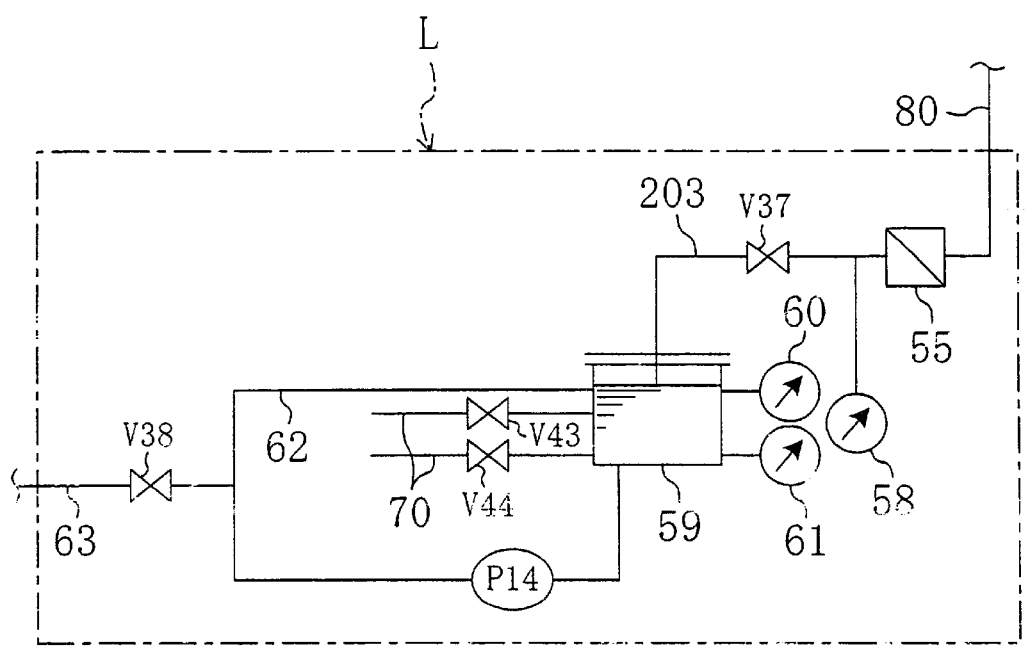
FIG. 18 illustrates a recycled slurry supply section in the polishing slurry rejuvenating apparatus according to the first embodiment.

FIG. 18 illustrates an exemplary construction for the recycled slurry supply section L according to the first embodiment. As shown in FIG. 18, the recycled slurry supply section L includes a filter 55 and a slurry supply tank 59, which are coupled together through a blend supply line 203 including a slurry densitometer 58 and a valve V37. The filter 55 is coupled not only to the blend supply line 203 but also to another blend supply line 80 at the incoming end. The slurry supply tank 59 is coupled not only to the blend supply line 203 but also to a supplied slurry stirring and circulating line 62 with a pump P14. The line 62 is coupled to a slurry supply line 63 at the outgoing end by way of a valve V38.

A particle size distribution analyzer 60 and a zeta potentiometer 61 are attached to the slurry supply tank 59. One side of the tank 59 is provided with two sampling ports 70, which are located about 10 cm below the surface of the blend and about 5 cm above the bottom of the tank 59, respectively, and their associated valves V43 and V44 to monitor the composition of the blend.

The recycled polishing slurry, which has been obtained by blending the non-used polishing slurry with the rejuvenated slurry, has already had its contaminants removed by the filter 18 of the solid filtering section E. However, other harmful particles, which have come from somewhere in this rejuvenating apparatus, might have been mixed into the recycled polishing slurry, which is ready to be supplied into the CMP polisher 100. Thus, those particles should be removed using the filter 55. The filter 55 should capture those large particles and should not affect the concentration of abrasive grains. Accordingly, a filter with a pore diameter between 100 and 200 $\mu$m, both inclusive, is preferably used as the filter 55, as well as the filter 18. In the illustrated embodiment, a filter with a pore diameter of 120 $\mu$m is used. After the recycled slurry has passed through the filter 55, the concentration of abrasive grains should be checked using the slurry densitometer 58 (or a solid concentration meter), thereby controlling the recycled slurry. In the recycled slurry, which has had its contaminants removed by the filter 55, abrasive grains are contained at a concentration 99% or more of the non-used polishing slurry.

Hereinafter, it will be described how the recycled slurry supply section L operates.

First, the recycled slurry, which has been prepared by the slurry blending section K shown in FIG. 17, is passed through the filter 55 shown in FIG. 18, and then introduced into, and once reserved in, the slurry supply tank 59 by way of the blend supply line 203.

Next, the particle size distribution analyzer 60 and the zeta potentiometer 61 control the composition of the recycled slurry in the slurry supply tank 59. Thereafter, the pump P14 is run to make the recycled slurry circulate through the supplied slurry stirring and circulating line 62. And then the channel is switched to the slurry supply line 63, thereby supplying the recycled slurry to the CMP polisher 100. In this case, if the slurry in the tank is circulated continuously, then the particle size of abrasive grains may increase, thus possibly causing micro-scratches. To avoid such an unfavorable situation, the slurry should be circulated intermittently. Specifically, the slurry may be circulated for 5 to 10 minutes once an hour.

Optionally, a filter may be provided for the slurry supply line 63 such that recycled slurry, which has had its fine contaminants removed, can be supplied to the CMP polisher 100.

Airtight Tanks

In the polishing slurry rejuvenating apparatus according to the first embodiment, all the tanks are airtight. These structures are adopted to prevent the composition of the slurry stored in any of the tanks from changing due to exposure to the air and to prevent dried-out slurry from being deposited and adhered onto the inner walls of the tank.

Embodiment 2

Next, a second exemplary embodiment of the present invention will be described with reference to the accompanying drawings. The polishing slurry rejuvenating apparatus and method according to the second embodiment is essentially the same as that described in the first embodiment with reference to FIG. 1. The second embodiment is different from the first embodiment only in detailed constructions of the fine particle filtering and re-dispersing sections F and J.

Removal of Fine Contaminants and Fine Abrasive Grains

Figure 19:
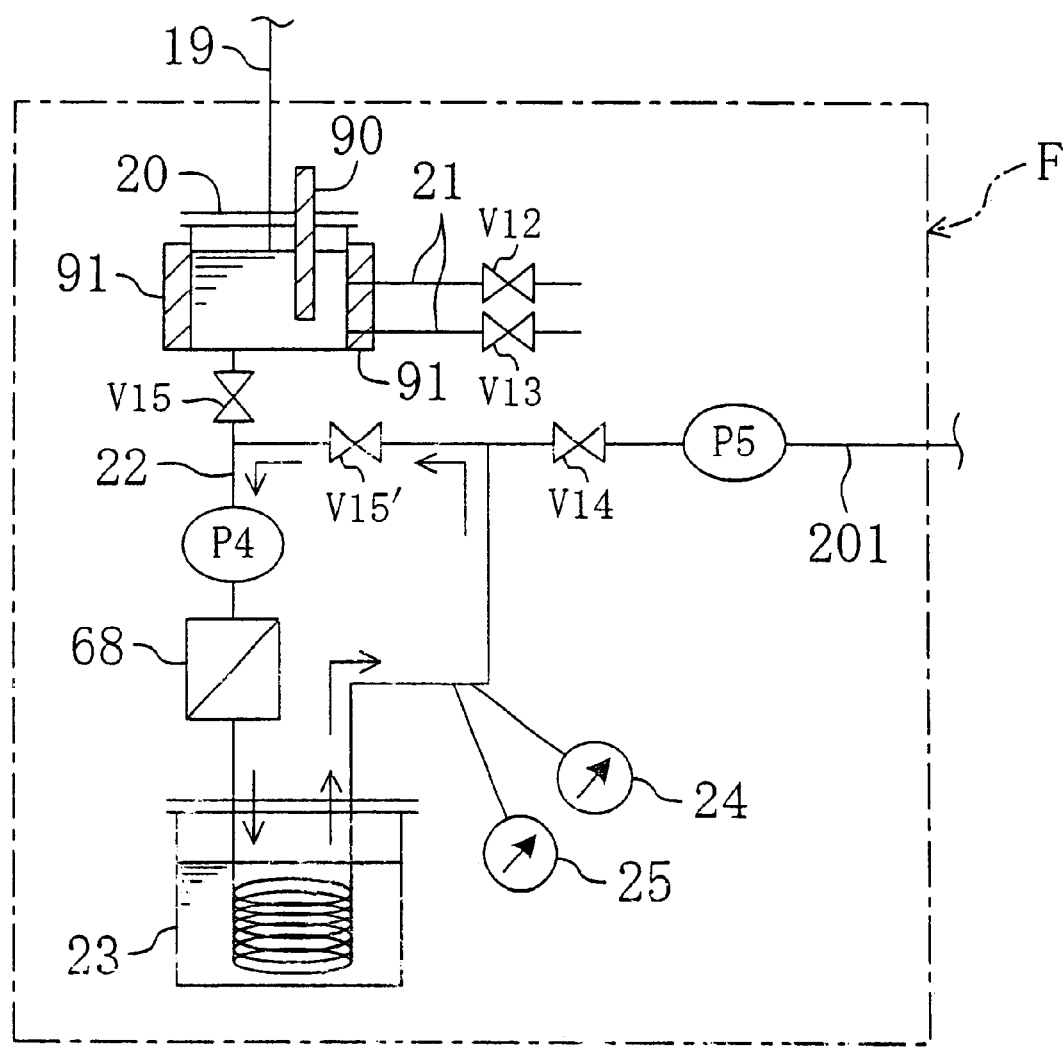
FIG. 19 illustrates a fine particle filtering section of a polishing slurry rejuvenating apparatus according to a second embodiment of the present invention.

FIG. 19 illustrates an exemplary construction for the fine particle filtering section F according to the second embodiment. As shown in FIG. 19, the fine particle filtering section F includes waste tank 20, microfiltration film 68, heat exchange tank 23 and circulating/temperature-controlling/filtering line 22. The microfiltration film 68 is made of a hollow fiber membrane with a pore diameter of 0.25 $\mu$m and filters the waste supplied from the waste tank 20. The heat exchange tank 23 is provided to regulate the temperature of the filtered waste. And the line 22 is provided to circulate the filtered waste between the microfiltration film 68 and the heat exchange tank 23.

According to the second embodiment, the waste tank 20 is provided with an in-tank ultrasonic generator 90 and another ultrasonic generator 91. The in-tank ultrasonic generator 90 is immersed in the waste so as not to be in contact with the inner walls or bottom of the tank 20. The ultrasonic generator 91 is attached to the external sidewall of the tank 20.

The waste tank 20 is coupled not only to the high-concentration waste line 19 at the incoming end, but also to the line 22 by way of a valve V15. One side of the tank 20 is provided with two sampling ports 21, which are located about 10 cm below the surface of the waste and about 5 cm above the bottom of the tank 20, respectively, and their associated valves V12 and V13 to monitor a change in composition of the waste.

The circulating/temperature-controlling/filtering line 22 forms a closed loop with a pump P4 interposed between the valve V15 and the microfiltration film 68 and with another valve V15' interposed between the outlet of the heat exchange tank 23 and the pump P4. A solid concentration meter 24 and a slurry thermometer 25 are provided between the heat exchange tank 23 and the valve V15'. The line 22 is coupled to the dispersion medium pH control tank 26 by way of a high-concentration waste line 201 including a valve V14 and a pump P5.

Hereinafter, it will be described how the fine particle filtering section F operates.

First, the high-concentration waste, which has had its large contaminants removed, is introduced through the high-concentration waste line 19 into the waste tank 20 as shown in FIG. 19. Then, large particles in the high-concentration waste, which has been introduced into the waste tank 20, are re-dispersed in the tank 20 by ultrasonic radiation that has been emitted from the ultrasonic generators 90 and 91 at an output power between 400 and 800 W and at a frequency between 10 and 30 kHz. These particles are re-dispersed to reduce their size to that of secondary particles effectively applicable to polishing. By performing this ultrasonic processing, clogging of the microfiltration film 68 is avoidable and almost no effective particles are filtered out through the microfiltration film 68. Thus, in the rejuvenating apparatus according to the second embodiment, used abrasive grains can be rejuvenated even more efficiently. In addition, the useful life of the microfiltration film 68 can be prolonged, too.

Subsequently, the high-concentration waste, which has been delivered from the waste tank 20, is compulsorily circulated in the circulating/temperature-controlling/filtering line 22 using the pump P4, thereby stirring up the high-concentration waste. Also, in this case, fine contaminants and fine particles of degraded abrasive grains are removed from the high-concentration waste by getting the waste filtered through the microfiltration film 68.

Moreover, since the composition of slurry is changeable with temperature, the temperature of the high-concentration waste should be regulated using the heat exchange tank 23. Accordingly, to avoid gelation of the slurry at a low temperature or its agglomeration at a high temperature, the temperature of the high-concentration waste is controlled and optimized using the slurry thermometer 25 and the concentration of solids in the high-concentration waste is controlled and optimized using the solid concentration meter 24.

Re-dispersing Process

Figure 20:
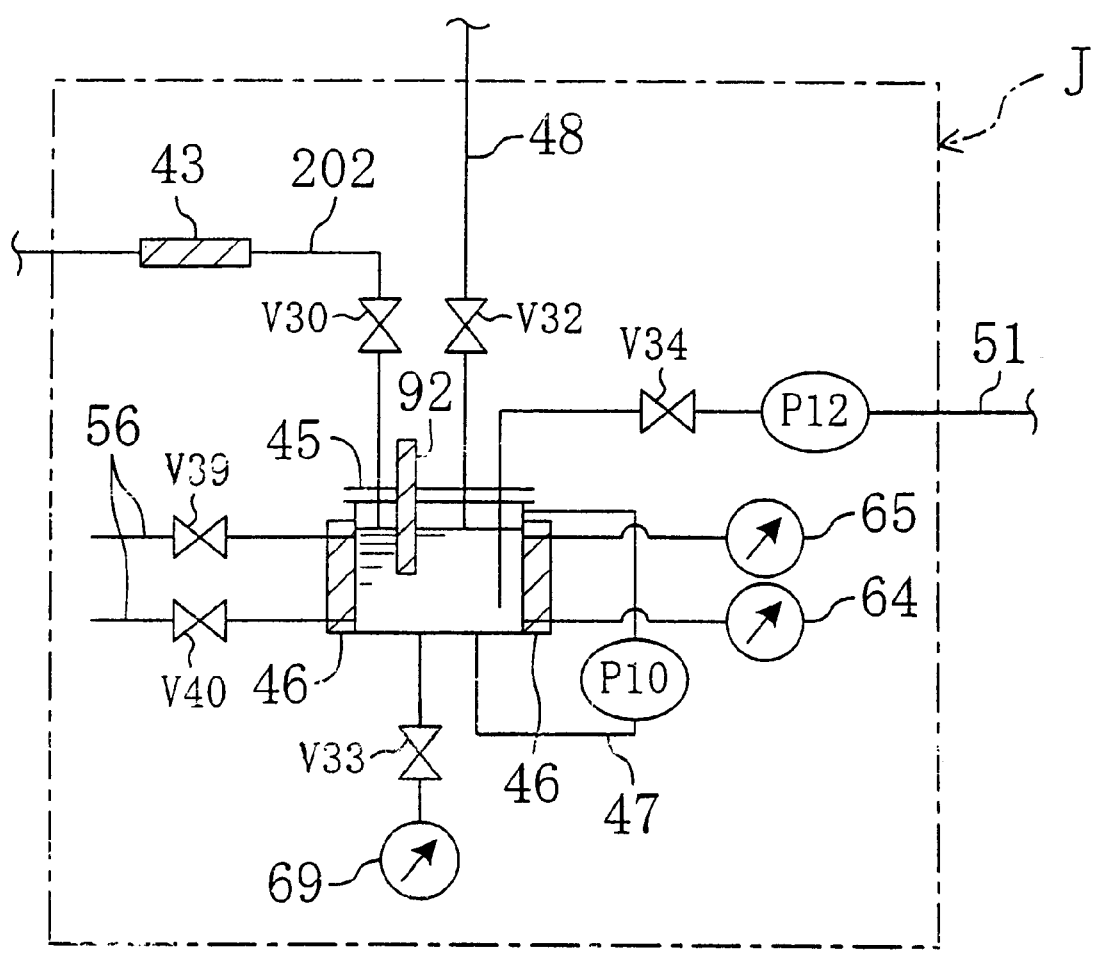
FIG. 20 illustrates a re-dispersing section of the polishing slurry rejuvenating apparatus according to the second embodiment.
Figure 21:
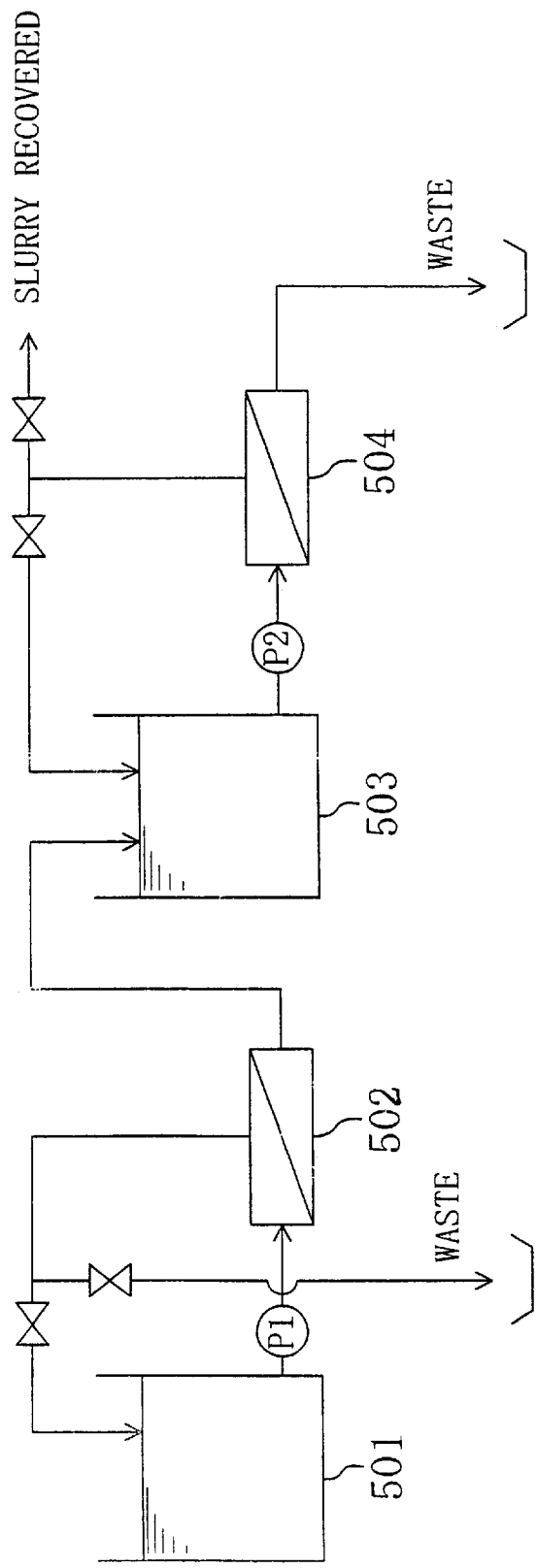
FIG. 21 illustrates a prior art polishing slurry recovery system.

FIG. 20 illustrates an exemplary construction for the re-dispersing section J according to the second embodiment. As shown in FIG. 20, the re-dispersing section J includes the re-dispersion tank 45.

The re-dispersion tank 45 is coupled to the high-concentration waste line 202 and the dispersant/pressurized $N_2$ supply line 48 at the incoming end and to a rejuvenated slurry line 51 at the outgoing end. The high-concentration waste line 202 includes an electromagnetic processor 43 and a valve V30. The dispersant/pressurized $N_2$ supply line 48 includes a valve V32. And the rejuvenated slurry line 51 includes a valve V34 and a pump P12.

A stirring/circulating line 47 with a pump P10, a particle size distribution analyzer 64, a solid concentration meter 65 and a zeta potentiometer 69 with a valve V33 are attached to the re-dispersion tank 45. One side of the tank 45 is provided with two sampling ports 56, which are located about 10 cm below the surface of the slurry and about 5 cm above the bottom of the tank 45, respectively, and their associated valves V39 and V40 to monitor the composition of the rejuvenated slurry.

According to the second embodiment, the re-dispersion tank 45 includes not only an ultrasonic generator 46 attached to the outer sidewall thereof, but also an in-tank ultrasonic generator 92, which is immersed in the waste so as not to be in contact with the inner walls or bottom of the tank 45.

As in the first embodiment, the re-dispersing section J of the second embodiment also re-disperses large particles by applying electromagnetic field and/or ultrasonic radiation and/or adding the dispersant.

Hereinafter, it will be described how the re-dispersing section J operates.

First, the high-concentration waste, which has had the concentration of its dispersion medium controlled, is introduced into the re-dispersion tank 45 through the high-concentration waste line 202 as shown in FIG. 20. In this case, the large particles contained in the high-concentration waste are re-dispersed by the electromagnetic field applied from the electromagnetic processor 43 while the waste is passing through the high-concentration waste line 202.

Next, the large particles in the high-concentration waste that has been introduced into the re-dispersion tank 45 are further re-dispersed by the ultrasonic radiation emitted from the ultrasonic generators 46 and 92 provided for the re-dispersion tank 45. In the illustrated embodiment, the ultrasonic radiation is preferably applied at an output power between about 400 and about 800 W and at an oscillation frequency between about 10 and about 30 kHz. According to the second embodiment, the in-tank ultrasonic generator 92 is further provided to be immersed in the waste in addition to the ultrasonic generator 46 attached to the outer sidewall of the tank 45. Thus, the ultrasonic radiation can be applied uniformly to the entire high-concentration waste.

Furthermore, the dispersant is also introduced through the dispersant/pressurized $N_2$ supply line 48 into the high-concentration waste. This dispersant can disperse those agglomerated particles from each other by changing the charged states of the particles. Accordingly, the large particles in the high-concentration waste are re-dispersed even more uniformly due to the injection of the dispersant. In addition, the dispersant can effectively suppress the agglomeration of particles by increasing the zeta potential of the particles. Thus, by using the dispersant, it is also possible to prevent the re-dispersed abrasive grains from re-agglomerating together.

As in the first embodiment, an anionic high-molecular surfactant is used as the dispersant according to the second embodiment. Alternatively, if colloidal silica particles are used as the abrasive grains, the re-dispersion is realizable just by adding deionized water and there is no need to add any dispersant.

Moreover, by running the pump P10 in the stirring/circulating line 47 attached to the re-dispersion tank 45, the large particles in the entire high-concentration waste can be re-dispersed uniformly. In this manner, those particles can be dispersed just like the abrasive grains contained in non-used polishing slurry.

Also, the effects of the re-dispersion process on the high-concentration waste can be checked without sampling using the zeta potentiometer 69, particle size distribution analyzer 64 and solid concentration meter 65 provided for the re-dispersion tank 45.

What is claimed is:

1. A method for rejuvenating a polishing slurry to be applied to a chemical-mechanical polishing apparatus for performing chemical-mechanical polishing of wafer, and to be applied to a rejuvenating apparatus, which recovers waste generated by the chemical-mechanical polishing apparatus, rejuvenates polishing slurry, and supplies the rejuvenated polishing slurry to the chemical-mechanical polishing apparatus, the method comprising the steps of:

a) separating a high-concentration waste, which contains contaminants at high concentrations discharged from the chemical-mechanical polishing apparatus during polishing, from a low-concentration waste, which contains contaminants at low concentrations discharged from the chemical-mechanical polishing apparatus during rinsing, b) neutralizing the low-concentration waste by a neutralizing agent, thereafter rinsing the rejuvenating apparatus using the neutralized low-concentration waste, c) recovering the polishing slurry from the high-concentration waste;

d) re-dispersing abrasive grains contained in the polishing slurry recovered; and e) mixing the re-dispersed high-concentration waste with fresh polishing slurry, thereafter supplying to the chemical-mechanical polishing apparatus.

2. The method of claim 1, wherein the step b) comprises the step of adding a dispersant to the polishing slurry recovered.

3. The method of claim 2, wherein the dispersant comprises an anionic high-molecular surfactant.

4. The method of claim 1, wherein the step b) comprises the step of applying an electromagnetic field to the polishing slurry recovered.

5. The method of claim 1, wherein the step b) comprises the step of applying ultrasonic radiation to the polishing slurry recovered.

6. The method of claim 5, wherein the ultrasonic radiation is applied at an output power of about 400 to about 800 W and at a frequency of about 10 to about 30 kHz.

7. The method of claim 1, further comprising the steps of:

c) filtering out fine particles in sizes equal to or smaller than a predetermined lower limit from the polishing slurry recovered;

d) filtering out large particles in sizes equal to or greater than a predetermined upper limit from the polishing slurry recovered; and e) controlling a hydrogen ion exponent (pH) of the polishing slurry recovered, wherein all of the steps c), d) and e) are performed after the step a) has been carried out.

8. The method of claim 7, wherein the step b) is performed before the step c) is carried out.

9. An apparatus for rejuvenating a polishing slurry that recovers waste generated by the chemical-mechanical polishing apparatus for performing chemical-mechanical polishing of wafer, rejuvenates polishing slurry, and supplies the rejuvenated polishing slurry to the chemical-mechanical polishing apparatus, the apparatus comprising:

means for separating a high-concentration waste, which contains contaminants at high concentrations discharged from the chemical-mechanical polishing apparatus during polishing, from a low-concentration waste, which contains contaminants at low concentrations discharged from the chemical-mechanical polishing apparatus during rinsing, means for neutralizing the low-concentration waste by neutralizing agent, thereafter rinsing the rejuvenating apparatus using the neutralized low-concentration waste, means for recovering the polishing slurry from the high-concentration waste;

means for re-dispersing abrasive grains contained in the polishing slurry recovered; and means for mixing the re-dispersed high-concentration waste with fresh polishing slurry, thereafter supplying to the chemical-mechanical polishing apparatus.

10. The apparatus of claim 9, wherein the re-dispersing means re-disperses the abrasive grains by adding a dispersant to the polishing slurry recovered.

11. The apparatus of claim 10, wherein the dispersant comprises an anionic high-molecular surfactant.

12. The apparatus of claim 9, wherein the re-dispersing means re-disperses the abrasive grains by applying an electro-magnetic field to the polishing slurry recovered.

13. The apparatus of claim 9, wherein the re-dispersing means re-disperses the abrasive grains by applying ultrasonic radiation to the polishing slurry recovered.

14. The apparatus of claim 13, wherein the ultrasonic radiation is applied at an output power of about 400 to about 800 W and at a frequency of about 10 to about 30 kHz.

15. The apparatus of claim 9, further comprising:

means for filtering out fine particles in sizes equal to or smaller than a predetermined lower limit from the polishing slurry recovered;

means for filtering out large particles in sizes equal to or greater than a predetermined upper limit from the polishing slurry recovered; and means for controlling a hydrogen ion exponent (pH) of the polishing slurry recovered.

16. The apparatus of claim 15, wherein the large particle filtering means comprises a filter with a pore diameter between 100 $\mu$m and 200 $\mu$m, both inclusive.

17. The apparatus of claim 15, wherein the abrasive grains are dispersed again by the re-dispersing means before the fine particles are removed by the fine particle filtering means.

* * * * *